US012549283B2

(12) United States Patent
Khoshnevisan et al.

(10) Patent No.: US 12,549,283 B2
(45) Date of Patent: Feb. 10, 2026

(54) SLOT-BASED FEEDBACK CODEBOOK TYPE SWITCHING

(71) Applicant: QUALCOMM Incorporated, San Diego, CA (US)

(72) Inventors: Mostafa Khoshnevisan, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 18/309,311

(22) Filed: Apr. 28, 2023

(65) Prior Publication Data
US 2024/0364457 A1 Oct. 31, 2024

(51) Int. Cl.
*H04L 1/00* (2006.01)
*H04L 5/00* (2006.01)
*H04W 72/0446* (2023.01)

(52) U.S. Cl.
CPC .......... *H04L 1/0073* (2013.01); *H04L 1/0009* (2013.01); *H04L 5/0044* (2013.01); *H04W 72/0446* (2013.01)

(58) Field of Classification Search
CPC ... H04L 1/0073; H04L 1/0009; H04L 1/1614; H04L 1/1822; H04L 1/1864; H04L 1/1896; H04L 5/0044; H04W 72/0446
See application file for complete search history.

(56) References Cited

U.S. PATENT DOCUMENTS

2020/0187181 A1* 6/2020 Hwang ............. H04W 72/0446
2021/0234643 A1* 7/2021 Wang .................... H04L 1/1887
2022/0232541 A1* 7/2022 Xu ......................... H04L 1/1854

FOREIGN PATENT DOCUMENTS

WO WO 2020/143588 * 2/2020 ............... H04L 1/16
WO 2020143588 A1 7/2020

(Continued)

OTHER PUBLICATIONS

3GPP TSG RAN WG1 #106bis-e e-Meeting, Oct. 11-19, 2021; R1-2109482 (Year: 2021).*

(Continued)

*Primary Examiner* — Mark D Featherstone
*Assistant Examiner* — Rong Tang
(74) *Attorney, Agent, or Firm* — Holland & Hart LLP

(57) ABSTRACT

Methods, systems, and devices for wireless communications are described. A UE may receive control signaling indicating feedback codebook types that the UE is permitted to use for transmitting feedback codebook payloads in feedback time slots and indicating that switching between feedback codebook types is enabled. The UE may monitor for, and a network entity may transmit, one or more first messages within one or more first time slots and one or more second messages within one or more second time slots. The UE may transmit, in a first feedback time slot, a first feedback codebook payload in accordance with a first feedback codebook type based on the monitoring, and may transmit, in a second feedback time slot, a second feedback codebook payload in accordance with a second feedback codebook type based on the monitoring and on the control signaling indicating that switching between feedback codebook types is enabled.

27 Claims, 19 Drawing Sheets

(56) References Cited

FOREIGN PATENT DOCUMENTS

WO       2023006344  A1       2/2023
WO    WO 2023/006344    *    2/2023    ............... H04L 1/16

OTHER PUBLICATIONS

International Search Report and Written Opinion—PCT/US2024/022502—ISA/EPO—Jul. 4, 2024.
Samsung: "On HARQ-ACK Reporting Enhancements", 3GPP TSG RAN WG1 #106bis-e, R1-2109482, 3rd Generation Partnership Project (3GPP), Mobile Competence Centre, 650, Route Des Lucioles, F-06921 Sophia-antipolis Cedex, France, vol. RAN WG1, No. e-Meeting, Oct. 11-Oct. 19, 2021, Oct. 1, 2021, 14 Pages, XP052058428, Section 2.2.
Moderator (China Telecom): "FL Summary#3 of joint channel estimation for PUSCH", 3GPP TSG RAN WG1 #106bis-e, R1-2110503, e-Meeting, Oct. 11-19, 2021, 115 Pages.

* cited by examiner

Control Signaling 215

DCI Signaling 220

PDCCH Signaling 225

Uplink Signaling 230

SLOT-BASED FEEDBACK CODEBOOK TYPE SWITCHING

FIELD OF TECHNOLOGY

The following relates to wireless communications, including slot-based feedback codebook type switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support slot-based feedback codebook type switching. For example, the described techniques provide for switching between different codebook types for transmitting feedback messages (e.g., hybrid automatic repeat request (HARQ) acknowledgment (HARQ-ACK) messages) in different time slots. For example, a UE may receive control signaling (e.g., radio resource control (RRC)) indicating one or more different feedback codebook types for use in transmitting feedback codebook payloads in one or more time slots and enabling switching between feedback codebook types in different slots. For example, an RRC message may indicate a Type 1 codebook type that is based on one or more physical downlink shared channel (PDSCH) reception occasions, a Type 2 codebook that is based on one or more received downlink control information (DCI) messages, or a physical downlink control channel (PDCCH) monitoring occasion (PMO) based codebook type based on one or more PMOs. The UE may monitor for and receive one or more messages indicating to transmit feedback, and may select a codebook type for transmitting a codebook feedback payload for the one or more messages based on a slot in which the feedback transmission is to be transmitted. For example, the UE may select a codebook type (e.g., from the one or more configured codebook types) based on a size of a codebook associated with one codebook type being smaller than a size of a codebook associated with a different codebook type, or based on a difference between the two sizes failing to satisfy a threshold, where the sizes may be based on a feedback time slot. A codebook type may also be based on one or more downlink or uplink component carriers, including one or more primary cells (PCells) or special secondary cells (SCells). In some examples, a network entity may transmit an indication of a codebook type to the UE via semi-static signaling (e.g., RRC), dynamic signaling (e.g., medium access control control element (MAC-CE)), or within the one or more messages (e.g., within DCI scheduling PDSCH transmissions). After selecting a codebook type (e.g., at UE or based on indication from the network entity), the UE may transmit the codebook feedback payload.

A method for wireless communications at a user equipment (UE) is described. The method may include receiving control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots, monitoring for one or more first messages within one or more first time slots and one or more second messages within one or more second time slots, transmitting, in a first feedback time slot of the set of multiple feedback time slots, a first feedback codebook payload in accordance with a first feedback codebook type of the set of multiple feedback codebook types based on monitoring for the one or more first messages within the one or more first time slots, and transmitting, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots.

An apparatus for wireless communications at a UE is described. The apparatus may include a processor, memory coupled with the processor, and instructions stored in the memory. The instructions may be executable by the processor to cause the apparatus to receive control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots, monitor for one or more first messages within one or more first time slots and one or more second messages within one or more second time slots, transmit, in a first feedback time slot of the set of multiple feedback time slots, a first feedback codebook payload in accordance with a first feedback codebook type of the set of multiple feedback codebook types based on monitoring for the one or more first messages within the one or more first time slots, and transmit, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots.

Another apparatus for wireless communications at a UE is described. The apparatus may include means for receiving control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots, means for monitoring for one or more first messages within one or more first time slots and one or more second messages within one or more second time slots, means for transmitting, in a first feedback time slot of the set of multiple feedback time slots, a first feedback codebook payload in accordance with a first feedback codebook type of the set of multiple feedback codebook types based on monitoring for the one or more first messages within the one or more first time slots, and means for transmitting, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots.

A non-transitory computer-readable medium storing code for wireless communications at a UE is described. The code may include instructions executable by a processor to receive control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots, monitor for one or more first messages within one or more first time slots and one or more second messages within one or more second time slots, transmit, in a first feedback time slot of the set of multiple feedback time slots, a first feedback codebook payload in accordance with a first feedback codebook type of the set of multiple feedback codebook types based on monitoring for the one or more first messages within the one or more first time slots, and transmit, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots.

In some examples of the method, apparatuses, and non-transitory computer-readable medium described herein, transmitting the second feedback codebook payload may include operations, features, means, or instructions for transmitting the second feedback codebook payload in accordance with the second feedback codebook type based on a size of the second feedback codebook payload associated with the second feedback codebook type being less than a size of a feedback codebook payload associated with a different codebook type of the set of multiple feedback codebook types.

In some examples of the method, apparatuses, and non-transitory computer-readable medium described herein, transmitting the second feedback codebook payload may include operations, features, means, or instructions for transmitting the second feedback codebook payload in accordance with the second feedback codebook type based on a difference between a size of the second feedback codebook payload associated with the second feedback codebook type and a size of a feedback codebook payload associated with a different codebook type of the set of multiple feedback codebook types failing to satisfy a threshold.

Some examples of the method, apparatuses, and non-transitory computer-readable medium described herein may further include operations, features, means, or instructions for receiving an indication of a pattern mapping the first feedback codebook type to the first feedback time slot and the second feedback codebook type to the second feedback time slot.

In some examples of the method, apparatuses, and non-transitory computer-readable medium described herein, the indication of the pattern may be received within the control signaling, within second control signaling, or both.

Some examples of the method, apparatuses, and non-transitory computer-readable medium described herein may further include operations, features, means, or instructions for receiving an indication to switch from the first feedback codebook type to the second feedback codebook type, where transmitting the second feedback codebook payload in accordance with the second feedback codebook type may be based on receiving the indication to switch.

Some examples of the method, apparatuses, and non-transitory computer-readable medium described herein may further include operations, features, means, or instructions for receiving, within the one or more first messages, an indication of the first feedback codebook type, where transmitting the first feedback codebook payload in accordance with the first feedback codebook type may be based on receiving the indication of the first feedback codebook type.

Some examples of the method, apparatuses, and non-transitory computer-readable medium described herein may further include operations, features, means, or instructions for receiving, within the one or more second messages, an indication of the second feedback codebook type, where transmitting the second feedback codebook payload in accordance with the second feedback codebook type may be based on receiving the indication of the second feedback codebook type.

Some examples of the method, apparatuses, and non-transitory computer-readable medium described herein may further include operations, features, means, or instructions for transmitting a capability message indicating that the UE supports codebook type switching, where transmitting the first feedback codebook payload in accordance with the first feedback codebook type and the second feedback codebook payload in accordance with the second feedback codebook type may be based on transmitting the capability message.

Some examples of the method, apparatuses, and non-transitory computer-readable medium described herein may further include operations, features, means, or instructions for transmitting the first feedback codebook payload in accordance with the first feedback codebook type may be based on the first feedback codebook type being associated with a first component carrier on which the one or more first messages may be scheduled for transmission and transmitting the second feedback codebook payload in accordance with the second feedback codebook type may be based on the second feedback codebook type being associated with a second component carrier on which the one or more second messages may be scheduled for transmission.

Some examples of the method, apparatuses, and non-transitory computer-readable medium described herein may further include operations, features, means, or instructions for transmitting the first feedback codebook payload in accordance with the first feedback codebook type may be based on the first feedback codebook type being associated with a first component carrier on which the first feedback codebook payload may be scheduled for transmission and transmitting the second feedback codebook payload in accordance with the second feedback codebook type may be based on the second feedback codebook type being associated with a second component carrier on which the second feedback codebook payload may be scheduled for transmission.

In some examples of the method, apparatuses, and non-transitory computer-readable medium described herein, the first component carrier and the second component carrier each correspond to one of a primary cell or a special secondary cell.

In some examples of the method, apparatuses, and non-transitory computer-readable medium described herein, the one or more first messages, the one or more second messages, or both, includes one or more downlink control information messages, one or more physical downlink shared channel messages, or any combination thereof.

In some examples of the method, apparatuses, and non-transitory computer-readable medium described herein, the first feedback codebook type, the second feedback codebook type, or both, may be associated with a quantity of physical downlink shared channel reception occasions, a quantity of received downlink control information messages, a quantity of physical downlink control channel monitoring occasions, one or more feedback process numbers, or any combination thereof.

A method for wireless communications at a network entity is described. The method may include transmitting control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots, transmitting one or more first messages within one or more first time slots and one or more second messages within one or more second time slots, receiving, in a first feedback time slot of the set of multiple feedback time slots, a first feedback codebook payload in accordance with a first feedback codebook type of the set of multiple feedback codebook types based on transmitting the one or more first messages within the one or more first time slots, and receiving, in a second feedback time slot of the set of multiple feedback time slots, a second feedback codebook payload in accordance with a second feedback codebook type of the set of multiple feedback codebook types based on transmitting the one or more second messages within the one or more second time slots and the control signaling indicating that switching between feedback codebook types is enabled in different feedback time slots.

An apparatus for wireless communications at a network entity is described. The apparatus may include a processor, memory coupled with the processor, and instructions stored in the memory. The instructions may be executable by the processor to cause the apparatus to transmit control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots, transmit one or more first messages within one or more first time slots and one or more second messages within one or more second time slots, receive, in a first feedback time slot of the set of multiple feedback time slots, a first feedback codebook payload in accordance with a first feedback codebook type of the set of multiple feedback codebook types based on transmitting the one or more first messages within the one or more first time slots, and receive, in a second feedback time slot of the set of multiple feedback time slots, a second feedback codebook payload in accordance with a second feedback codebook type of the set of multiple feedback codebook types based on transmitting the one or more second messages within the one or more second time slots and the control signaling indicating that switching between feedback codebook types is enabled in different feedback time slots.

Another apparatus for wireless communications at a network entity is described. The apparatus may include means for transmitting control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots, means for transmitting one or more first messages within one or more first time slots and one or more second messages within one or more second time slots, means for receiving, in a first feedback time slot of the set of multiple feedback time slots, a first feedback codebook payload in accordance with a first feedback codebook type of the set of multiple feedback codebook types based on transmitting the one or more first messages within the one or more first time slots, and means for receiving, in a second feedback time slot of the set of multiple feedback time slots, a second feedback codebook payload in accordance with a second feedback codebook type of the set of multiple feedback codebook types based on transmitting the one or more second messages within the one or more second time slots and the control signaling indicating that switching between feedback codebook types is enabled in different feedback time slots.

A non-transitory computer-readable medium storing code for wireless communications at a network entity is described. The code may include instructions executable by a processor to transmit control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots, transmit one or more first messages within one or more first time slots and one or more second messages within one or more second time slots, receive, in a first feedback time slot of the set of multiple feedback time slots, a first feedback codebook payload in accordance with a first feedback codebook type of the set of multiple feedback codebook types based on transmitting the one or more first messages within the one or more first time slots, and receive, in a second feedback time slot of the set of multiple feedback time slots, a second feedback codebook payload in accordance with a second feedback codebook type of the set of multiple feedback codebook types based on transmitting the one or more second messages within the one or more second time slots and the control signaling indicating that switching between feedback codebook types is enabled in different feedback time slots.

In some examples of the method, apparatuses, and non-transitory computer-readable medium described herein, receiving the second feedback codebook payload may include operations, features, means, or instructions for receiving the second feedback codebook payload in accordance with the second feedback codebook type based on a size of the second feedback codebook payload associated with the second feedback codebook type being less than a size of a feedback codebook payload associated with a different codebook type of the set of multiple feedback codebook types.

In some examples of the method, apparatuses, and non-transitory computer-readable medium described herein, receiving the second feedback codebook payload may include operations, features, means, or instructions for receiving the second feedback codebook payload in accordance with the second feedback codebook type based on a difference between a size of the second feedback codebook payload associated with the second feedback codebook type and a size of a feedback codebook payload associated with a different codebook type of the set of multiple feedback codebook types failing to satisfy a threshold.

Some examples of the method, apparatuses, and non-transitory computer-readable medium described herein may further include operations, features, means, or instructions for transmitting an indication of the second feedback codebook type based on a size of the second feedback codebook payload associated with the second feedback codebook type being less than a size of a feedback codebook payload associated with a different codebook type of the set of multiple feedback codebook types, a difference between the size of the second feedback codebook payload and the size of the feedback codebook payload failing to satisfy a threshold, based on one or more component carriers on which the one or more first messages, the one or more second messages, the first feedback codebook payload, or the second feedback codebook payload may be scheduled for transmission, or any combination thereof.

In some examples of the method, apparatuses, and non-transitory computer-readable medium described herein, transmitting the indication may include operations, features, means, or instructions for transmitting an indication of a pattern mapping the first feedback codebook type to the first feedback time slot and the second feedback codebook type to the second feedback time slot.

In some examples of the method, apparatuses, and non-transitory computer-readable medium described herein, the indication of the pattern may be transmitted within the control signaling, within second control signaling, or both.

In some examples of the method, apparatuses, and non-transitory computer-readable medium described herein, transmitting the indication may include operations, features, means, or instructions for transmitting an indication to switch from the first feedback codebook type to the second feedback codebook type, where receiving the second feedback codebook payload in accordance with the second feedback codebook type may be based on transmitting the indication to switch.

In some examples of the method, apparatuses, and non-transitory computer-readable medium described herein, transmitting the indication may include operations, features, means, or instructions for transmitting, within the one or more first messages, an indication of the first feedback codebook type, where receiving the first feedback codebook payload in accordance with the first feedback codebook type may be based on transmitting the indication of the first feedback codebook type and transmitting, within the one or more second messages, an indication of the second feedback codebook type, where receiving the second feedback codebook payload in accordance with the second feedback codebook type may be based on transmitting the indication of the second feedback codebook type.

Some examples of the method, apparatuses, and non-transitory computer-readable medium described herein may further include operations, features, means, or instructions for receiving a capability message indicating that the UE supports codebook type switching, where receiving the first feedback codebook payload in accordance with the first feedback codebook type and the second feedback codebook payload in accordance with the second feedback codebook type may be based on receiving the capability message.

Some examples of the method, apparatuses, and non-transitory computer-readable medium described herein may further include operations, features, means, or instructions for receiving the first feedback codebook payload in accordance with the first feedback codebook type may be based on the first feedback codebook type being associated with a first component carrier on which the one or more first messages may be scheduled for transmission and receiving the second feedback codebook payload in accordance with the second feedback codebook type may be based on the second feedback codebook type being associated with a second component carrier on which the one or more second messages may be scheduled for transmission.

Some examples of the method, apparatuses, and non-transitory computer-readable medium described herein may further include operations, features, means, or instructions for receiving the first feedback codebook payload in accordance with the first feedback codebook type may be based on the first feedback codebook type being associated with a first component carrier on which the first feedback codebook payload may be scheduled for transmission and transmitting the second feedback codebook payload in accordance with the second feedback codebook type may be based on the second feedback codebook type being associated with a second component carrier on which the second feedback codebook payload may be scheduled for transmission.

In some examples of the method, apparatuses, and non-transitory computer-readable medium described herein, the first component carrier and the second component carrier each correspond to one of a primary cell or a special secondary cell.

In some examples of the method, apparatuses, and non-transitory computer-readable medium described herein, the one or more first messages, the one or more second messages, or both, includes one or more downlink control information messages, one or more physical downlink shared channel messages, or any combination thereof.

In some examples of the method, apparatuses, and non-transitory computer-readable medium described herein, the first feedback codebook type, the second feedback codebook type, or both, may be associated with a quantity of physical downlink shared channel reception occasions, a quantity of received downlink control information messages, a quantity of physical downlink control channel monitoring occasions, one or more feedback process numbers, or any combination thereof.

DETAILED DESCRIPTION

Figure 1:
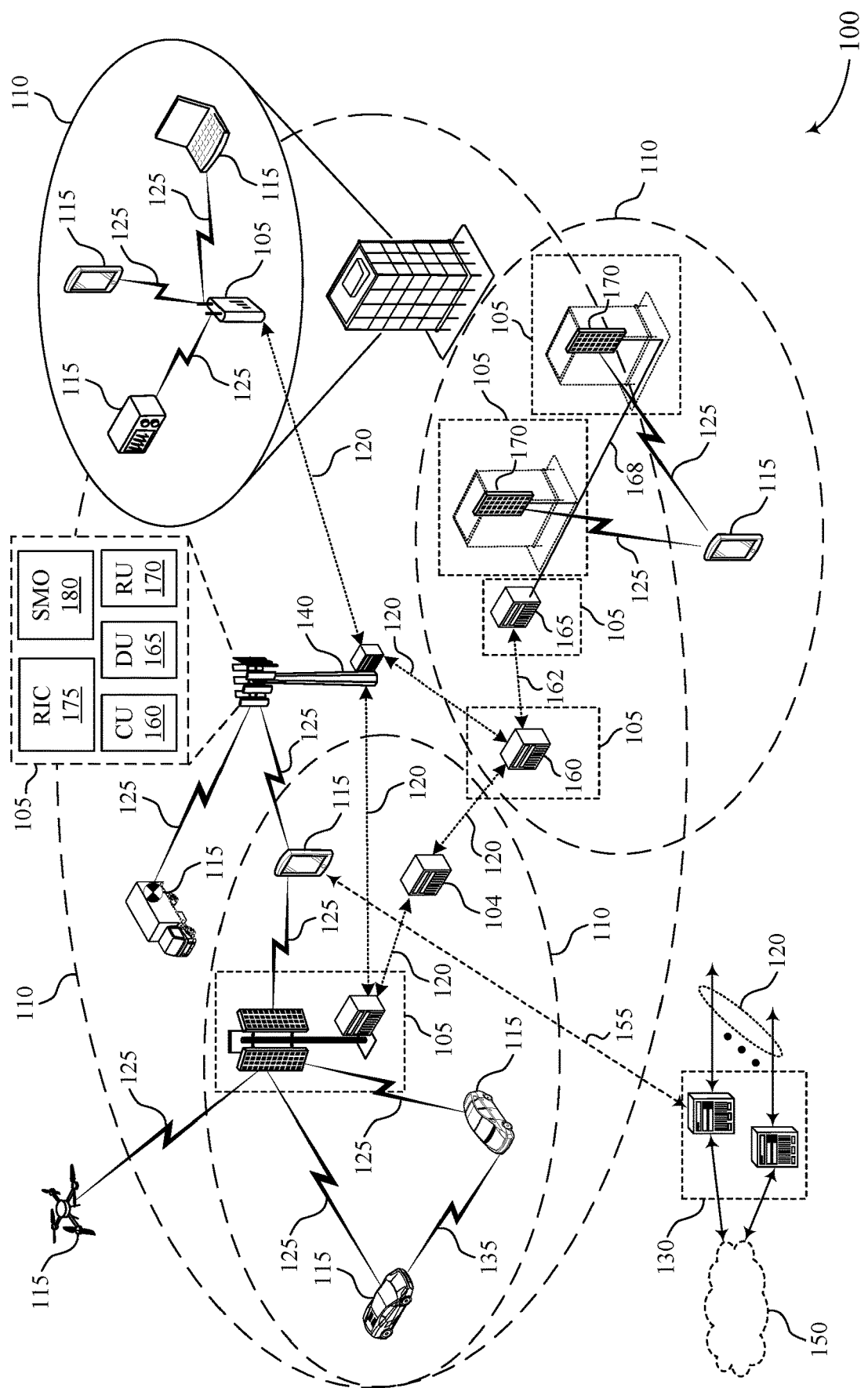
FIG. 1 shows an example of a wireless communications system that supports slot-based feedback codebook type switching in accordance with one or more aspects of the present disclosure.

In wireless communications systems, a user equipment (UE) may transmit feedback for one or more received messages. For example, a UE may receive control signaling (e.g., downlink control information (DCI)) for scheduling data transmissions (e.g., physical downlink shared channel (PDSCH) transmissions), and may transmit a feedback message to indicate successful decoding of the control signaling, the data transmissions, or both. In some cases, feedback messages (e.g., hybrid automatic repeat request (HARQ) acknowledgment (HARQ-ACK) messages) may be transmitted using different codebook types. For example, a UE may transmit a feedback message in a time slot used for feedback transmissions (e.g., a feedback time slot) using a semi-static codebook type, such as a Type 1 codebook, where a size of a Type 1 codebook may be based on a quantity of candidate data reception occasions before the time slot (e.g., PDSCH reception occasions). Additionally, or alternatively, the UE may transmit a feedback message in a time slot using a dynamic codebook type, such as a Type 2 codebook, where a size of a Type 2 codebook may be based on a quantity of control information messages (e.g., DCI) received in one or more control message monitoring occasions before the time slot (e.g., physical downlink control channel (PDCCH) monitoring occasions (PMOs)). However, due to a difference in Type 1 and Type 2 codebook size calculations (or of other codebook types, such as Type 3), different codebook types may result in different codebook sizes for transmitting uplink messages in a time slot. Additionally, or alternatively, some codebooks (e.g., semi-static codebook types) may be more reliable than others (e.g., dynamic codebook types) where one or more resources may be wasted or a reliability of transmission reduced due to a given codebook in use. Thus, improved methods for selecting a codebook type for feedback messages transmitted in different time slots may be desired.

A wireless communications system may support switching between different codebook types for transmitting feedback messages (e.g., HARQ-ACK) in different time slots. For example, a UE may select between a Type 1 codebook type, a Type 2 codebook type, or a PMO-based codebook type, where a size of a semi-static PMO-based codebook may be based on a number of PMOs in a set of time slots. In some examples, a UE may select a codebook type resulting in a smaller codebook size. For example, the UE may select between a Type 1 or PMO-based codebook type based on which type of codebook results in a smaller codebook size for transmitting a feedback message in a time slot. Additionally, or alternatively, the UE may select a codebook type based on a size of a codebook being smaller than another codebook of another codebook type by a margin or threshold. The UE may select a codebook type for each component carrier of each time slot, or for use across all component carriers of a cell group or a physical uplink control channel (e.g., PUCCH) group. In some examples, a network entity may select a codebook type (e.g., using the aforementioned methods), and may indicate the selected codebook type to the UE. For example, the network entity may configure the UE (e.g., using radio resource control (RRC)) to transmit feedback messages in time slots used for switching from downlink to uplink using PMO-based codebooks, and to transmit feedback messages in uplink slots using Type 1 codebooks. Additionally, or alternatively, the network entity may transmit a dynamic indication to switch codebook types for each time slot or to update a configured codebook type pattern in a control message (e.g., a medium access control control element (MAC-CE) or within DCI). In some cases, codebook types may also be a function of an uplink component carrier on which the feedback message is transmitted, where codebook types may be configured differently for different component carriers (e.g., differently for primary cell (PCells) and special secondary cells (SCells)). In some examples, the UE may indicate support for feedback codebook type switching for one or more time slots, patterns, or component carriers in a capability message.

Aspects of the disclosure are initially described in the context of wireless communications systems. Aspects of the disclosure are further illustrated by and described with reference to wireless communication systems, slot diagrams, and process flows. Aspects of the disclosure are further illustrated by and described with reference to apparatus diagrams, system diagrams, and flowcharts that relate to slot-based feedback codebook type switching.

FIG. 1 shows an example of a wireless communications system 100 that supports slot-based feedback codebook type switching in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support slot-based feedback codebook type switching as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support switching between different codebook types for transmitting feedback messages (e.g., HARQ-ACK messages) in different time slots. For example, a UE may select between a Type 1 codebook type, a Type 2 codebook type, or a PMO-based codebook type, where a size of a semi-static PMO-based codebook may be based on a quantity of PMOs in a set of time slots. In some examples, a UE may select a codebook type resulting in a smaller codebook size. For example, the UE may select between a Type 1 or PMO-based codebook type based on which type of codebook results in a smaller codebook size for transmitting a feedback message in a time slot as described with respect to FIG. 4. In some examples, a network entity may select a codebook type (e.g., using the aforementioned methods), and may indicate the selected codebook type to the UE semi-statically (e.g., via RRC) or dynamically (e.g., via MAC-CE or DCI). In some examples, the UE may indicate support for feedback codebook type switching for one or more time slots, patterns, or component carriers in a capability message. Additionally, or alternatively, codebook type selection may be based on one or more downlink component carriers or uplink component carriers.

Figure 2:
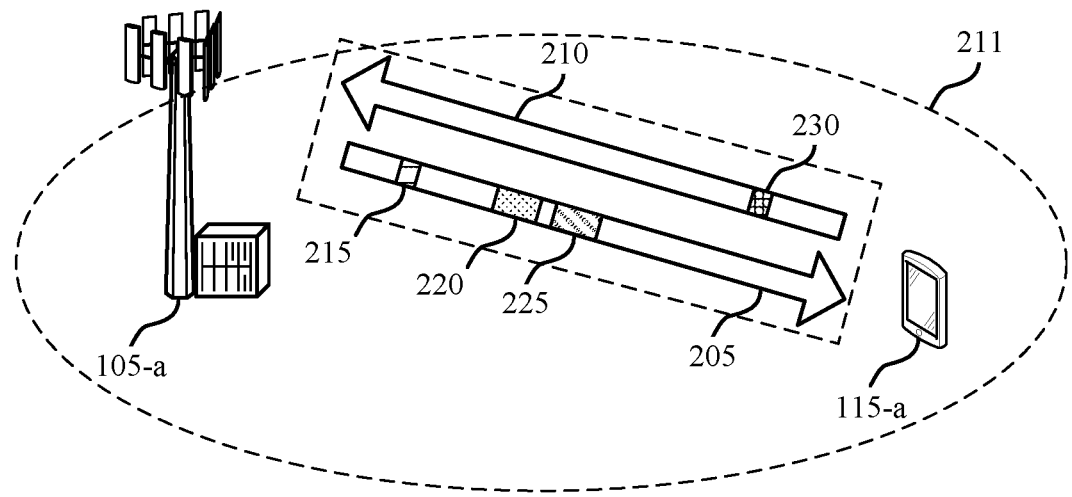
FIG. 2 shows an example of a wireless communications system that supports slot-based feedback codebook type switching in accordance with one or more aspects of the present disclosure.
Figure 2:
Figure 2:
Figure 2:
Figure 2:

FIG. 2 shows an example of a wireless communications system 200 that supports slot-based feedback codebook type switching in accordance with one or more aspects of the present disclosure. The wireless communications system 200 may illustrate an example for implementing one or more aspects of the wireless communications system 100. For example, the wireless communications system 200 may include a network entity 105-a in communication with a UE 115-a using a downlink communication link 205 and an uplink communication link 210, which may represent a network entity 105, a UE 115, and one or more communication links 125 as described with reference to FIG. 1. The network entity 105-a may additionally include a serving cell 211, where the serving cell 211 may represent a coverage area 110 described with respect to FIG. 1. For example, the serving cell 211 may represent a serving cell (e.g., a downlink serving cell, an uplink serving cell, or both) of the network entity 105-a to provide service for one or more UEs 115 including the UE 115-a. In some examples, the wireless communications system 200 may support slot-based feedback codebook type switching using one or more different types of codebooks.

For example, the network entity 105-a may transmit, to the UE 115-a via the downlink communication link 205, control signaling 215, which may be an example of an RRC signal indicating one or more parameters for configuring the UE 115-a. The network entity 105-a may also transmit DCI signaling 220, PDCCH signaling 225, or both. For example, the network entity 105-a may transmit one or more DCIs in the DCI signaling 220 to schedule one or more PDCCH data transmissions of the PDCCH signaling 225, or to indicate other control information to the UE 115-a. Additionally, or alternatively, the UE 115-a may transmit, to the network entity 105-a via the uplink communication link 210, various uplink signaling 230. For example, based on the DCI signaling 220, the PDCCH signaling 225, or both, the UE 115-a may transmit feedback, such as one or more HARQ-ACK messages to indicate successful decoding of one or more DCIs or PDCCH messages, or to indicate a decoding result of one or more PDSCHs that are scheduled by the one or more DCIs or PDCCH messages.

In some examples, the UE 115-a may support different codebook types for transmitting feedback (e.g., indicated within the control signaling 215). For example, the UE 115-a may support Type 1 codebooks, Type 2 codebooks, Type 3 codebooks, PMO-based codebooks, among other types of codebooks as described herein, where the UE 115-a may transmit a feedback message (e.g., a HARQ-ACK message) in the uplink signaling 230 according to a codebook, where a codebook may map one or more bits of the feedback message to one or more antenna ports or antennas of the UE 115-a.

In some examples, a Type 1 codebook may be determined using semi-static information. For example, a Type 1 codebook may be based on one or more candidate PDSCH occasions, where a PDSCH occasion may be one or more symbols in which the UE 115-a may receive a PDSCH transmission. Specifically, a size of a Type 1 codebook in a slot n may be based on a quantity of candidate PDSCH occasions in a $K_1$ window, or time defined by a $K_1$ value, for each downlink component carrier. In an example, the UE 115-a may determine a set of candidate PDSCH occasions on a per downlink serving cell basis. For example, the UE 115-a may be configured with a set of slot timing offset values, or $K_1$ values, where each of the set of $K_1$ values may represent an offset between a candidate PDSCH occasion and transmission of a feedback message (e.g., a HARQ-ACK response). In some examples, the set of $K_1$ values may be indicated to the UE by RRC signaling or may be a fixed set, and one value from the set of K1 values may be indicated by DCI (e.g., within the DCI signaling 220). In an example, the UE 115-a may be configured with a set of $K_1$ values including 11, 2, 3, 4, 5, 6, 7, 81 if DCI 1_0 is configured and DCI 1_1 is not configured in the serving cell 211, and may receive a DCI within the DCI signaling 220 indicating one or more $K_1$ values of the set of $K_1$ values. Additionally, or alternatively, if DCI format 1_1, DCI format 1_2, or both are configured for the serving cell, the set of $K_1$ values may be provided by a parameter dl-DataToUL-ACK. For example, the UE 115-a may receive a PUCCH configuration within RRC signaling of the control signaling 215 indicating the set of $K_1$ values.

The UE 115-a may consider one or more PDSCH candidates of the set of PDSCH candidates while determining the Type 1 codebook, where each PDSCH candidate may represent a PDSCH time domain resource allocation (TDRA)

candidate. For example, each PDSCH TDRA candidate may correspond to a start and length indicator (SLIV) within a slot. In some cases, the UE 115-*a* may remove PDSCH TDRA candidates that overlap with semi-static uplink symbols (e.g., in time division duplex, or TDD systems) as described with reference to FIG. 3. The UE 115-*a* may group the remaining TDRA candidates (e.g., TDRA rows) after removing the overlapping TDRA candidates such that a quantity (e.g., number) of groups is equal to a maximum quantity of non-overlapping SLIVs in the slot. In some cases, the UE 115-*a* may refrain from grouping the remaining TDRA candidates. For example, if a maximum quantity of PDSCH transmissions that can be received in a slot is 1, then there may be only 1 bit (one PDSCH occasion) per $K_1$ value. In some examples, if a PDSCH transmission is not scheduled (e.g., via DCI or other signaling) for a given candidate PDSCH occasion with HARQ-ACK in a slot n, a bit in a HARQ-ACK feedback message may be set to NACK.

A Type 2 codebook may be determined using dynamic information. For example, a Type 2 codebook may be determined based on one or more PMOs (PDCCH monitoring occasions) and one or more DAIs received via DCI (e.g., within a DCI of the DCI signaling 220 including grant for one or more PDSCH receptions). Specifically, a size of a Type 2 codebook in a slot n may be based on a quantity (e.g., number) of received DCIs indicating to transmit HARQ-ACK in the slot n. Additionally, or alternatively, the Type 2 codebook may be based on a quantity of missing DCIs based on missing DAI values detected by the UE 115-*a*. For example, the order of the one or more PMOs may be used to order received DAIs based on which PMO they are received on. In an example, the UE 115-*a* may receive a first PDCCH DCI in a first PMO indicating a first DAI, and a second PDCCH DCI in a second PMO indicating a second DCI within the DCI signaling 220. The UE 115-*a* may then order the first DAI before the second DAI based on receiving the first DAI within the first PMO. In some examples, the UE 115-*a* may use the value of DAIs after ordering to detect holes corresponding to missing DCIs. For example, the first DAI may have a value of 1, and the second DAI may have a value of 3, and the UE 115-*a* may determine that a DAI of a value of 2 is missing. In some examples, the UE 115-*a* may insert a NACK in a Type 2 codebook corresponding to DAI holes.

In some examples, DAIs may be received in DCI of any of DCI format 1_0, DCI format 1_1, or DCI format 1_2. In some examples, a DAI may represent a counter DAI, which may indicate an accumulative quantity (e.g., number) of {serving cell, PMO} pairs in which DCI is detected (e.g., DCI that has associated HARQ-ACK, whether the DCI schedules PDSCH or not). The accumulative quantity of pairs may count up to the current serving cell and current PMO. In some examples, the pairs may be ordered as serving cell first (e.g., serving cell 211), and PMO second. Additionally, or alternatively, a DAI may represent a total DAI, which may indicate a total quantity (e.g., number) of {serving cell, PMO} pairs in which DCI is detected, up to the current PMO. For example, for a given PMO (e.g., for receiving DCIs of the DCI signaling 220), the network entity 105-*a* may transmit multiple DCIs over multiple component carriers. For each PMO, each DCI of the multiple component carriers may have a same total DAI value, but may have different counter DAI values, where the total DAI and counter DAI may be updated at each new PMO (e.g., after an end of a PMO or beginning of a new PMO). For example, the UE 115-*a* may assume a same total DAI value in all DCI format 1_1 and DCI format 1_2 DCIs received within a same PMO.

A PMO-based codebook may represent a semi-static codebook (e.g., a HARQ-ACK codebook different than a Type 1 codebook) that is based on one or more PMOs based on configured search space sets. For example, a PMO-based codebook may be based on a search space configuration or a PMO configuration received in RRC (e.g., in the control signaling 215). Specifically, a size of a PMO-based codebook in a slot n may be determined based on a quantity (e.g., number) of PMOs in a set of slots $n-\{K_{1,k}'\}$ where $K_1'=\{K_{1,0}', K_{1,1}', \ldots\}$ may represent a set of possible slot offset values from DCI reception to HARQ-ACK transmission. In an example, each place or location (e.g., bit) of a PMO-based codebook may correspond to one PMO. In some cases, similar to Type 1 codebook size calculation, the UE 115-*a* may omit configured PMOs that overlap with semi-static uplink symbols (e.g., in TDD) when determining the size of a PMO-based codebook. Additionally, or alternatively, the UE 115-*a* may consider PMOs that are configured for monitoring downlink DCI formats that have associated HARQ-ACK messages (e.g., DCI format 0_0/0_1/0_2). For example, if a search space set is configured for monitoring other DCI formats, the PMOs of that SS set may not be considered for PMO-based codebooks.

In some examples, the UE 115-*a* may receive a DCI in the DCI signaling 220 in a first PMO, where the DCI may indicate to transmit feedback (e.g., HARQ-ACK feedback) in a slot n. In some cases, the DCI may schedule a PDSCH transmission, where a bit within the feedback (e.g., HARQ-ACK) may be set corresponding to a decoding result of the PDSCH. For example, a bit in a HARQ-ACK may be set of ACK if the corresponding PDSCH is successfully decoded, whereas the bit may be set of a negative ACK (NACK) if the PDSCH is not successfully decoded. Additionally, or alternatively, the DCI may not schedule a PDSCH transmission. For example, the DCI may indicate a semi-persistent scheduling (SPS) release, an SCell dormancy, a transmission configuration indicator (TCI) state change, among other indications. In some examples, the bit in a HARQ-ACK message may be set of ACK or NACK based on a successful or unsuccessful decoding of the DCI. In some examples, if no DCI is received in the first PMO, or DCI received does not indicate to transmit HARQ-Ack in the slot n, the bit may be set to NACK.

The UE 115-*a* may additionally support the use of one or more additional codebooks, including Type 3 codebooks, among other codebooks. In some examples, a Type 3 codebook (e.g., a size of) may be based on one or more feedback process numbers, such as HARQ feedback process identification numbers.

Figure 3:
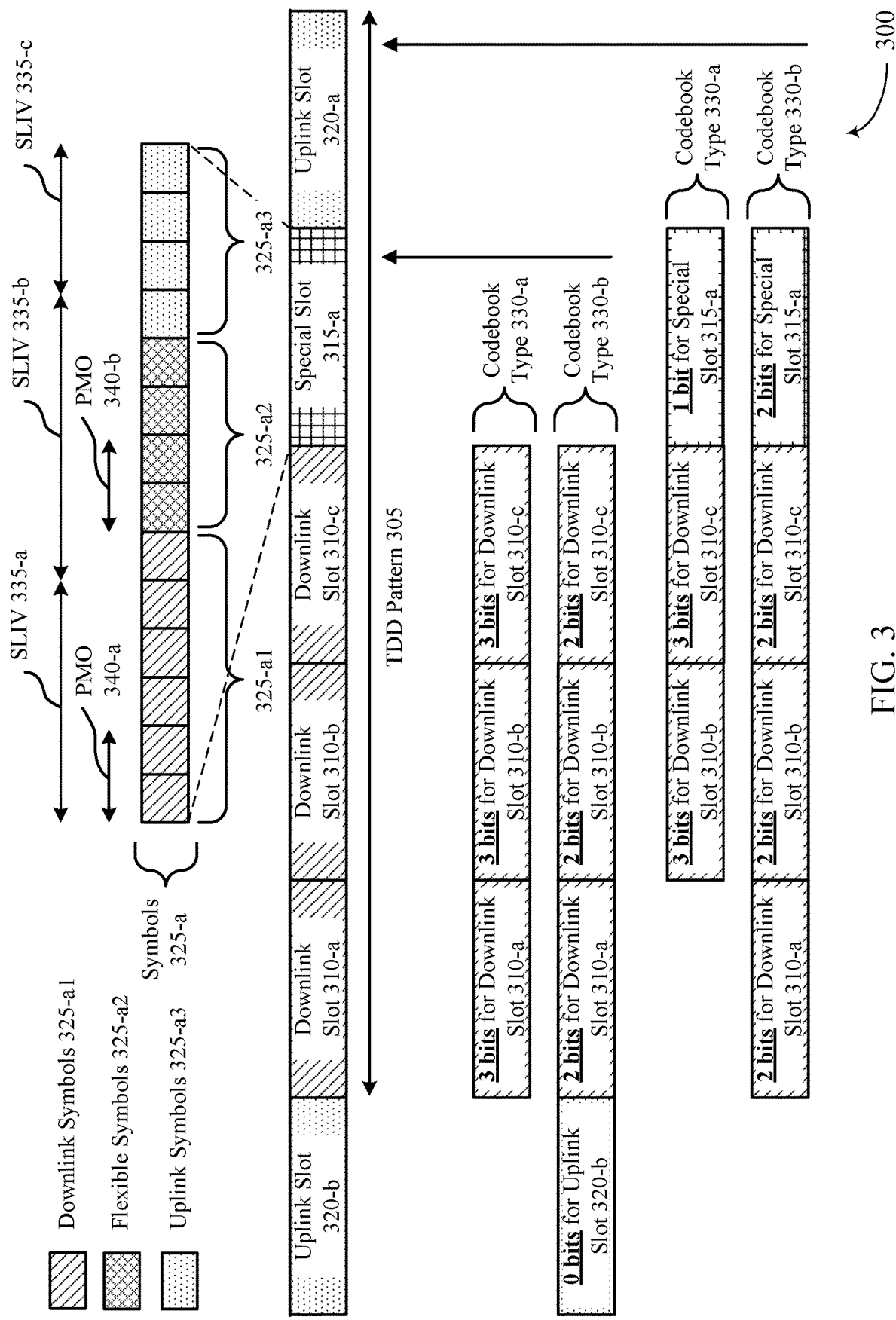
FIG. 3 shows an example of a slot diagram that supports slot-based feedback codebook type switching in accordance with one or more aspects of the present disclosure.

FIG. 3 shows an example of a slot diagram 300 that supports slot-based feedback codebook type switching in accordance with one or more aspects of the present disclosure. The slot diagram 300 may illustrate an example for implementing one or more aspects of the wireless communications systems 100 and 200. For example, the slot diagram 300 may illustrate one or more slots used for downlink transmissions and uplink transmissions, including DCI signaling 220, PDCCH signaling 225, and uplink signaling 230 as described with reference to FIG. 2. In some examples, the slot diagram 300 may illustrate how, depending on a slot (e.g., time slot) in which a feedback message is transmitted, one feedback codebook type may provide different advantages compared to than another feedback codebook type.

For example, the UE 115-a may communicate with the network entity 105-a according to a time division duplex (TDD) pattern 305. For example, the TDD pattern 305 may include a downlink slot 310-a, a downlink slot 310-b, and a downlink slot 310-c followed by a special slot 315-a and an uplink slot 320-b, and may repeat. For example, the downlink slot 310-a may be preceded by an uplink slot 320-b at the end of a previous repetition of the TDD pattern 305. Downlink slots 310 may represent slots including one or more symbols 325 for receiving one or more downlink signals, including control signaling (e.g., PDCCH DCIs for scheduling PDSCH transmissions) and data signaling (e.g., PDSCH transmissions). Special slots may represent slots for both downlink and uplink transmissions. For example, the special slot 315-a may include symbols 325-a, which may include one or more downlink symbols 325-a1 supporting downlink transmissions, flexible symbols 325-a2 supporting downlink and uplink transmissions, and uplink symbols 325-a3 supporting uplink transmissions. Additionally, or alternatively, uplink slots 320 may be used for transmitting one or more uplink signals.

In some examples, a size for a given codebook type 330 used for transmitting one or more payloads, such as feedback codebook payloads, may be a function of a slot (e.g., a feedback time slot) in which feedback is transmitted. For example, as described herein with respect to FIG. 2, a size of semi-static codebooks (e.g., Type 1 and PMO-based HARQ-ACK codebooks) may depend on a quantity of PDSCH occasions in a $K_1$ window and a quantity of PMOs in a $K_1'$ window, respectively. Depending on uplink and downlink slot configurations preceding a slot in which such feedback is transmitted, a Type 1 codebook may have a smaller size, but in a second HARQ-ACK slot, PMO-based CB may have a smaller size.

For example, a first codebook type 330-a may represent a Type 1 codebook, while a second codebook type 330-b may represent a PMO-based codebook. The UE 115-a may be configured with a set of $K_1$ values where $K_1=\{1,2,3\}$, and where each PDSCH slot may include 3 non-overlapping SLIVs 335, which may represent candidate PDSCH TDRA occasions. For example, the downlink slots 310, the special slots 315, and the uplink slots 320 may each include a possible SLIV 335-a, a SLIV 335-b, and a SLIV 335-c, where a size of the first codebook type 330-a may be based on the previous 3 slots before a feedback transmission. The UE 115-b may additionally be configured with a set of $K_1'$ values where $K_1'=\{1,2,3,4\}$. Notably, $K_0\{0,1\}$ may represent possible slot offsets from DCI reception to PDSCH reception, $K_1=\{1,2,3\}$ may represent possible slot offsets from PDSCH reception to HARQ-ACK transmission, and $K_1'=\{1,2,3,4\}$ may represent possible slot offsets from DCI reception to HARQ-ACK transmission. Additionally, or alternatively, each slot (e.g., including each downlink slot 310, or PDCCH slot) may include 2 PMOs. For example, any one of the downlink slots 310, the special slots 315, or the uplink slots 320 may each include a PMO 340-a and a PMO 340-b, where a size of the second codebook type 330-b may be based on a previous 4 slots before a feedback transmission.

In a first example, a feedback codebook payload may be transmitted within the special slot 315-a (e.g., within the one or more uplink symbols 325-a3). Thus, a size of a codebook associated with (e.g., generated using) the first codebook type 330-a (e.g., Type 1) may be based on the downlink slots 310-a through 310-c. As described with respect to FIG. 2, the size of a Type 1 codebook may be based on a quantity of candidate PDSCH occasions in a $K_1$ window for each downlink component carrier. That is, each bit of the feedback payload may correspond to a possible SLIV 335 for which feedback may be transmitted. Thus, in the present example, the size of the payload may be calculated from 3 bits to represent each SLIV 335 of each potential slot for receiving PDSCHs. For example, the Type 1 codebook size may be 3+3+3=9 bits as a PDSCH may be received within any of the SLIVs 335 of the downlink slots 310-a through 310-c, where 3 bits may be calculated for the downlink slots 310-a, 3 bits may be calculated for the downlink slot 310-b, and 3 bits may be calculated for the downlink slot 310-c accordingly.

Additionally, or alternatively, a size of a codebook associated with (e.g., generated using) the second codebook type 330-b (e.g., PMO-based) may be based on the uplink slot 320-a through the downlink slot 310-c. As described with respect to FIG. 2, the size of a PMO-based codebook may be determined based on a quantity (e.g., number) of PMOs in a set of slots n−$\{K_{1,k}'\}$, where $K_1'=\{K_{1,0}', K_{1,0}', \ldots\}$. Thus, in the first example, the size of the payload using a PMO-based codebook may be based on 2 bits for each of the downlink slots 310 each containing two potential PMOs. Additionally, 0 bits may be considered for the uplink slot 320-b as PMOs within the uplink slots 320 may not be considered given a PDCCH indicating HARQ-ACK may not be received in an uplink slot 320. The size of the PMO-based codebook in the first example may then be 0+2+2+2=6 bits, where 0 bits may be calculated for the uplink slot 320-b, 2 bits may be calculated for the downlink slot 310-a, 2 bits may be calculated for the downlink slot 310-b, and 2 bits may be calculated for the downlink slot 310-c accordingly. Thus, the first example, the size of a codebook generated using the second codebook type 330-b (e.g., PMO-based) may be smaller than a size when using the first codebook type 330-a (e.g., Type 1). In other words, PMO-based codebooks may present a more efficient option for transmitting a semi-static codebook compared to Type 1 codebooks in such an example.

By way of a second example, a feedback codebook payload may be transmitted within the uplink slot 320-a. In such an example, a size of a codebook associated with (e.g., generated using) the first codebook type 330-a (e.g., Type 1) may be based on the downlink slots 310-b and 310-c and the special slot 315-a, whereas a size of a codebook associated with the second codebook type 330-b may be based on the downlink slots 310-a through 310-c and the special slot 315-a. As illustrated in FIG. 3, the SLIV 335-b and the SLIV 335-c within the special slot 315-a may each overlap with one or more of the uplink symbols 325-a3 (e.g., semi-static uplink symbols). Thus, as described with respect to FIG. 2, the UE 115-a may remove the SLIVs 335-b and 335-c (or PDSCH TDRA candidates) from consideration in codebook size, and may only add 1 bit for the special slot 315-a, while adding 3 bits for each of the downlink slots 310. Thus, a size of the first codebook type 330-a may be 3+3+1=7 bits, where 3 bits may be calculated for the downlink slot 310-b, 3 bits may be calculated for the downlink slot 310-c, and 1 bit may be calculated for the special slot 315-a accordingly.

Additionally, or alternatively, a size of a codebook associated with (e.g., generated using) the second codebook type 330-b may be different than the first example. For example, the UE 115-a may refrain from considering PMOs 340 that overlap with uplink symbols. As illustrated in FIG. 3, the PMOs 340-a and 340-b may not overlap with any uplink symbols within the downlink slots 310-a through 310-c and the special slot 315-a. Thus, a size of the second codebook type 330-b may be 2+2+2+2=8 bits, represented by 2 possible PMOs in each of the considered slots, where 2 bits may be calculated for the downlink slot 310-*a*, 2 bits may be calculated for the downlink slot 310-*b*, 2 bits may be calculated for the downlink slot 310-*c*, and 2 bits may be calculated for the special slot 315-*a* accordingly. Thus, for the second example, the size of the first codebook type 330-*a* (e.g., Type 1) may be smaller than the size of the second codebook type 330-*b* (e.g., PMO-based), where Type 1 codebooks may present a more efficient option for transmitting a semi-static codebook compared to PMO-based codebooks.

When comparing dynamic (e.g., Type 2) to semi-static codebooks (e.g., Type 1 or PMO-based), while a size of Type 2 codebook may be smaller, Type 2 codebooks may not be as robust against missing DCIs as Type 1 or PMO-based codebooks. For example, a Type 2 codebook may be generally smaller than Type 1 or PMO-based codebooks as a Type 2 codebook may be based on DCIs received that indicate to transmit HARQ-ACK, whereas Type 1 and PMO-based codebooks may be based on possible occasions for receiving PDSCHs and PDCCHs (e.g., DCIs). However, a Type 2 codebook may be more prone to errors in transmissions. For example, due to the Type 2 codebook being based on dynamic indications instead of semi-static configurations, a size of the Type 2 codebook may change if one or more DCIs are missed. In some examples, a network entity 105-*a* may have difficulty decoding Type 2 codebook if the size of the Type 2 codebook does not match what is expected (e.g., if all DCIs were received), resulting in one or more failed feedback transmissions.

In some cases, semi-static codebooks (Type 1 or PMO) may provide a more stable solution compared to dynamic codebooks if a size of CB increases little compared to dynamic (e.g., Type 2) codebooks. For example, if a large quantity of PDSCHs are scheduled, a Type 2 codebook size may increase. Additionally, or alternatively, multiple candidate PDSCH occasions or PMOs may overlap with semi-static uplink symbols, where a size of a Type 1 or PMO-based codebook (e.g., a codebook generated using a Type 1 or PMO-based codebook type) may be reduced as described herein. These and other conditions can change in different feedback (e.g., HARQ-ACK) slots as illustrated. Thus, if a size of a Type 2 codebook is not smaller than a threshold difference with a size of the Type 1 or PMO-based codebooks, semi-static codebooks may present a more stable option with little additional overhead. Otherwise, if there is large difference between codebook sizes, a Type 2 codebook may be advantageous (e.g., to save uplink overhead). Thus, resources may be wasted and a reliability of communications may be decreased when using one or more dynamic or semi-static codebooks that are fixed within different slots based on one or more slot configurations.

Techniques described herein may mitigate inefficient use of resources and decreased reliability of communications by enabling slot-based feedback codebook type switching. For example, the UE 115-*a* may switch codebooks from slot to slot based on a size of each possible codebook type or a threshold difference between codebook types as described with respect to FIG. 4. Additionally, or alternatively, the UE 115-*a* may receive an indication from the network entity 105-*a* of a codebook type for a given slot. In some examples, the UE 115-*a* may select a codebook type based on one or more uplink component carriers as described with respect to FIG. 5. By enabling switching of codebooks between slots, the UE 115-*a* may increase an efficiency of resource use while increasing a robustness in communications.

Figure 4:
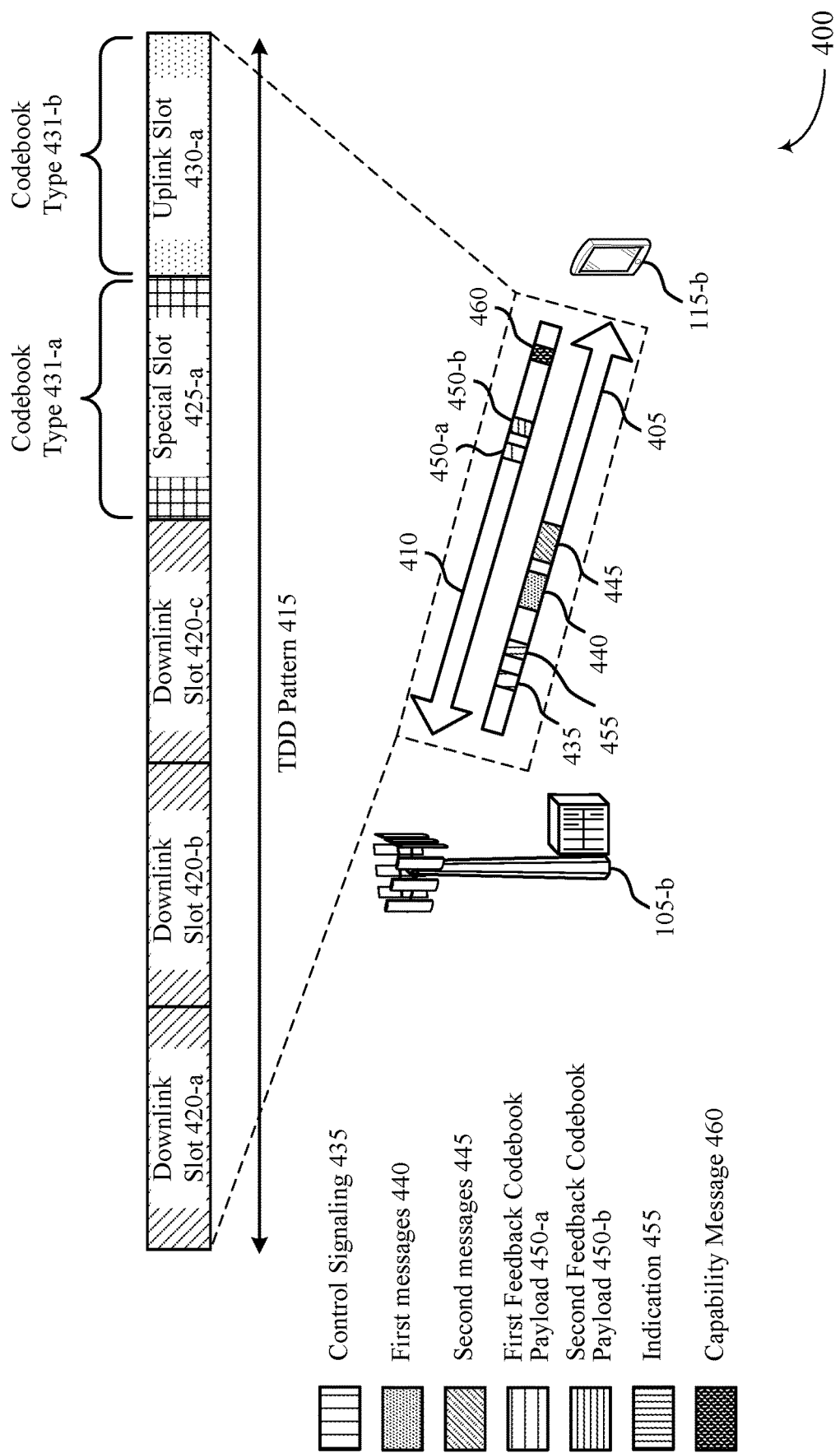
FIG. 4 shows an example of a wireless communications system that supports slot-based feedback codebook type switching in accordance with one or more aspects of the present disclosure.

FIG. 4 shows an example of a wireless communications system 400 that supports slot-based feedback codebook type switching in accordance with one or more aspects of the present disclosure. The wireless communications system 400 may illustrate an example for implementing one or more aspects of the wireless communications systems 100 and 200 and the slot diagram 300. For example, the wireless communications system 400 may illustrate signaling according between a network entity 105-*b* and a UE 115-*a* using a downlink communication link 405 and an uplink communication link 410, which may represent the network entity 105-*a*, the UE 115-*a*, the uplink communication link 205 and the downlink communication link 210 described with reference to FIGS. 2 and 3. The UE 115-*b* and the network entity 105-*b* may communication according to a TDD pattern 415, which may represent the TDD pattern 305, and may include one or more downlink slots 420 (including downlink slots 420-*a*, 420-*b*, and 420-*c*), special slots 425 (including special slot 425-*a*), and uplink slots 430 (including uplink slot 430-*a*), which may be examples of downlink slots 310, special slots 315, and uplink slots 320 described with respect to FIG. 3. In some examples, the wireless communications system 400 may illustrate switching feedback codebook types 431 in different feedback time slots.

For example, the network entity 105-*b* may transmit control signaling 435 to the UE 115-*b* indicating one or more feedback codebook types 431 (e.g., via RRC signaling). The network entity 105-*b* may additionally transmit one or more first messages 440 and one or more second messages 445, which may represent one or more PDSCH transmissions (e.g., transmitted over PDSCH TDRA candidates), one or more DCIs (e.g., PDCCHs transmitted over PMOs scheduling one or more PDSCH transmissions), one or more additional control or data messages, or any combination thereof. The UE 115-*b* may monitor for and receive the one or more first messages 440 and the one or more second messages 445. In some examples, the UE 115-*b* may transmit a first feedback payload 450-*a* using a first codebook type 431-*a* (e.g., Type 1, Type 2, Type 3, PMO-based, and the like) based on the one or more first messages 440 and a second feedback payload 450-*b* using a second feedback codebook type 431-*b* (e.g., Type 1, Type 2, Type 3, PMO-based, and the like) based on the one or more second messages 445.

In an example, the UE 115-*b* may be permitted or configured to switch between different feedback codebook types (e.g., a HARQ-ACK CB type) in different feedback time slots (e.g., HARQ-ACK slots). For instance, the UE 115-*b* may select a feedback codebook type 431 of the one or more configured feedback codebook types 431 for each feedback time slot, and the UE 115-*b* may switch the selected feedback codebook type 431 over time. For example, the UE 115-*b* may select between semi-static codebooks (e.g., Type 1 or PMO-based) and dynamic codebooks (e.g., Type 2), between different semi-static codebooks (e.g., Type 1 based on PDSCH occasions or PMO-based), or between any combination of codebooks (e.g., between Type 1, Type 2, PMO-based, Type 3 based on feedback process IDs, and the like). Additionally, or alternatively, the feedback codebook types 431 and feedback codebook payloads 450 may be any type of feedback, including HARQ-ACK feedback, channel state information report information, among other types of reports and feedback.

In some examples, the UE 115-*b* may select (e.g., determine) a codebook type for a feedback time slot based on a size of one or more codebooks associated with the feedback codebook types. For example, the UE 115-*b* may compare a size of a codebook associated with the first feedback codebook type 431-*a* to a size of the codebook associated with the second feedback codebook type 431-*b* to select a feedback codebook type 431 for transmitting feedback in the special slot 425-*a*. In an example, the UE 115-*b* may receive the one or more first messages 440, where the one or more first messages 440 may indicate to transmit feedback in the special slot 425-*a*. The UE 115-*b* may determine or calculate a size of a first codebook generated using the first feedback codebook type 431-*a* and determine or calculate a size of a second codebook generated using the second feedback codebook type 431-*b*. The UE 115-*b* may compare the sizes of the first and second codebooks, and may select the first feedback codebook type 431-*a* based on the first codebook having a smaller size. The UE 115-*b* may transmit the first feedback codebook payload 450-*a* in the special slot 425-*a* according to the first feedback codebook type 431-*a*. In some examples, the UE 115-*b* may select a feedback codebook type 431 based on size when determining between semi-static feedback codebook types (e.g., between Type 1 and PMO-based).

In some examples, if the sizes of the first codebook and the second codebook are the same, the UE 115-*b* may select a default feedback codebook type. For example, the control signaling 435 (e.g., RRC) may indicate (e.g., configure the UE with) a default feedback codebook type as Type 1, or the default feedback codebook type may be fixed (e.g., preconfigured at the UE 115-*b*). In some examples, the default codebook type may be any of Type 1, Type 2, Type 3, or PMO-based feedback codebook types.

In some examples, the UE 115-*b* may select a feedback codebook type based on a size of a codebook associated with a first type of codebook being smaller than a codebook associated with another feedback codebook type by a margin or threshold. For example, the UE 115-*b* may determine a difference of the sizes of the first and second codebooks, and may select a smallest codebook if the difference satisfies (e.g., equals or exceeds) a threshold value. In some examples, the UE 115-*b* may select a feedback codebook type based on comparing the difference to a threshold when comparing between semi-static feedback codebook types and dynamic feedback codebook types. If the codebook size is not substantially reduced, a semi-static feedback codebook type may be selected due to its reliability against missing DCIs as described with respect to FIG. 3. For example, the first feedback codebook type 431-*a* may represent a Type 1 codebook and the second feedback codebook type 431-*b* may be a Type 2 codebook, where the UE 115-*b* may select the first feedback codebook type 431-*a* for the special slot 425-*a* if the size of the second codebook fails to satisfy a threshold.

In some examples, the UE 115-*b* may select a different or same feedback codebook type for the uplink slot 430-*a* based on performing similar size and threshold comparisons. For example, the UE 115-*b* may determine that, for the uplink slot 430-*a*, a PMO-based codebook is smaller than a Type 1 codebook, and may select the second feedback codebook type 431-*b*, where the second feedback codebook type 431-*b* may be a PMO-based codebook. Additionally, or alternatively, the UE 115-*b* may select a Type 2 feedback codebook type based on the Type 2 codebook size satisfying a threshold, where the second feedback codebook type 431-*b* may be a Type 2 feedback codebook type. Additionally, or alternatively, the UE 115-*b* may select a Type 3 codebook based on similar size or threshold comparisons.

Size comparisons or selection may be done on a per component carrier basis. For example, the UE 115-*b* may select the first feedback codebook type 431-*a* for a first downlink component carrier (CC1) and may select the second feedback codebook type 431-*b* for a second downlink component carrier (CC2) after comparing sizes of codebooks associated with both feedback codebook types for each downlink component carrier, and may use the selected feedback codebook type for transmitting associated feedback. In some examples, the UE 115-*b* may select a same feedback codebook type across all component carriers in a cell group or PUCCH group. For example, the UE 115 may compare the sizes for the codebook types across all component carriers in the cell group to select a codebook type for transmitting feedback for the group. In some examples, if one of the feedback codebook types 431 (e.g., the second feedback codebook type 431-*b*) is dynamic (e.g., Type 2), the UE 115-*b* may refrain from per component carrier comparison and perform comparison across all component carriers. For example, Type 2 feedback codebooks (e.g., for HARQ-ACK) may be constructed across all component carriers. In some examples, the UE 115-*b* may perform per component carrier comparison for semi-static feedback codebook types (e.g., Type 1 or PMO-based).

A feedback codebook type may also be indicated to the UE 115-*b*, for example, on a per feedback time slot basis. For example, the network entity 105-*b* may transmit an indication 455 to the UE 115-*b* indicating to use the feedback codebook type 431-*a* for the special slot 425-*a* and to use the feedback codebook type 431-*b* for the uplink slot 430-*a*. In some examples, the indication 455 may be semi-statically transmitted. For example, a pattern of feedback codebook types 431 in each feedback time slot may be RRC-configured, where the pattern may repeat with a given periodicity. In some examples, the network entity 105-*b* may include the indication 455 in the control signaling 435 (e.g., RRC signaling) of a pattern mapping the first feedback codebook type 431-*a* to special slots 425 and the second feedback codebook type 431-*b* to uplink slots 430 of the TDD pattern 415. The network entity 105-*b* may also configure the TDD pattern 415 in a PCell with the indicated pattern for feedback codebook types in special slots 425 and uplink slots 430.

In some examples, the indication may be transmitted in one or more dynamic messages. For example, the network entity 105-*b* may transmit the indication 455 within a MAC-CE separate from the control signaling 435, where the indicated feedback codebook type may be applied in a persistent or sticky way following once activation command of the MAC-CE is applied. Additionally, or alternatively, the MAC-CE may indicate an updated pattern for the pattern configured with RRC to change the pattern of the feedback codebook types 431 across different feedback time slots.

Additionally, or alternatively, the indication 455 may be carried in DCI. For example, the one or more first messages may include a first DCI indicating to transmit HARQ-ACK feedback according to the first feedback codebook type 431-*a* in the special slot 425-*a*, and the one or more second messages may include a second DCI indicating to transmit second HARQ-ACK feedback according to the second feedback codebook type 431-*b* in the uplink slot 430-*a*. In some examples, when multiple DCIs indicate to transmit corresponding feedback (e.g., HARQ-ACK) in a same given time slot, the UE 115-*b* may assume all DCIs associated with a same slot to indicate a same feedback codebook type 431. For example, the one or more first messages 440 may include a first DCI and a third DCI both indicating to transmit various HARQ-ACK feedback in the special slot 425-*a* according to the first feedback codebook type 431-*a*.

Additionally, or alternatively, the UE 115-*b* may determine or select a feedback codebook type based on a last received DCI associated with a given time slot. For example, the first DCI may indicate to transmit HARQ-ACK feedback using the second feedback codebook type 431-*b*, while the third DCI may indicate to transmit additional HARQ-ACK feedback using the first feedback codebook type 431-*a*. The UE 115-*b* may select the first feedback codebook type 431-*a* based on the third DCI being a last DCI received for transmitting feedback in the special slot 425-*a*. In some examples, the network entity 105-*b* may update a previous feedback codebook assignment by including an updated codebook assignment in a last DCI (e.g., third DCI).

In some examples, the network entity 105-*b* may similarly select different feedback codebook types 431 to indicate semi-statically or dynamically based on comparing one or more sizes or size differences to a threshold as described herein. For example, the network entity 105-*b* may indicate a Type 1 or PMO-based codebook based on a smaller size, or a Type 2 codebook based on a size satisfying a threshold. The network entity 105-*b* may also consider other factors, such as a reliability of communications (e.g., by selecting Type 1 if a threshold is not satisfied) or a probability of HARQ-ACK codebook size misalignment (e.g., when dynamic feedback codebook types are indicated). The indication 455 may additionally be on a per component carrier basis (e.g., for Type 1) or across all component carriers of a cell group or PUCCH group (e.g., for Type 2).

In some examples, the UE 115-*b* may indicate support for feedback codebook type switching by transmitting a capability message 460 (e.g., HARQ-ACK feedback codebook type switching based on HARQ-ACK slot or component carriers of one or more PUCCH groups). For example, if the UE 115-*b* indicates support to switch from one codebook type to another between slots, the network entity 105-*b* may configure or enable codebook type switching in RRC. For example, the control signaling 435 may indicate that the UE 115-*b* may select one or more codebooks based on one or more comparisons or one or more indications in RRC or dynamic signaling of a pattern or selected feedback codebook type for each time slot.

Figure 5:
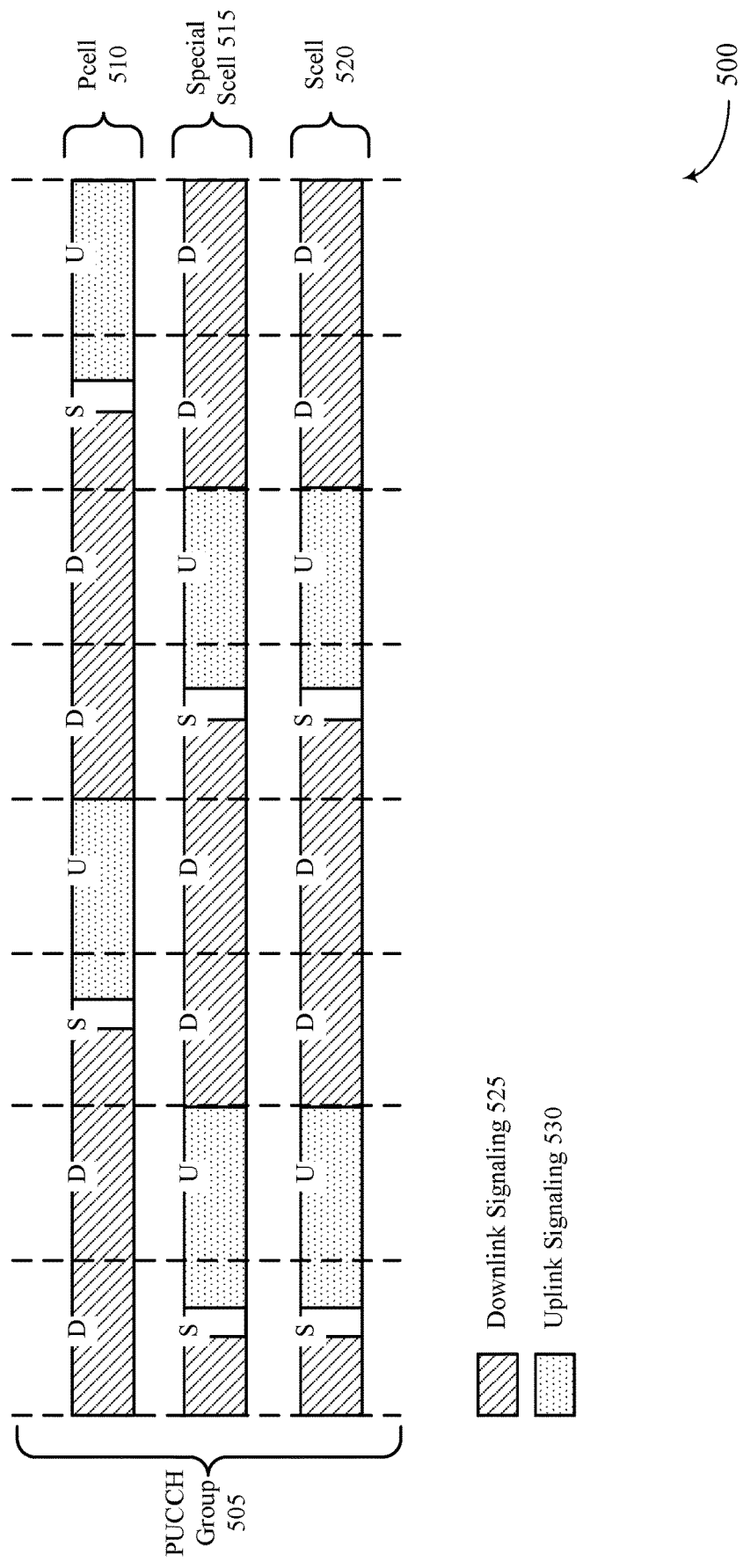
FIG. 5 shows an example of a slot diagram that supports slot-based feedback codebook type switching in accordance with one or more aspects of the present disclosure.

FIG. 5 shows an example of a slot diagram 500 that supports slot-based feedback codebook type switching in accordance with one or more aspects of the present disclosure. The slot diagram 500 may illustrate an example for implementing one or more aspects of the wireless communications systems 100, 200, and 400, and the slot diagram 300. For example, the slot diagram 500 may illustrate signaling between the UE 115-*b* and the network entity 105-*b* within one or more time slots of the TDD pattern 415 and according to one or more feedback codebook types 431 described with respect to FIG. 4. In some examples, the slot diagram 500 may illustrate how a feedback codebook type may be based on (e.g., may be a function of) a component carrier on which corresponding feedback is transmitted.

For example, the UE 115-*b* and the network entity 105-*b* may support cell switching, such as PUCCH cell switching, allowing transmission of uplink messages (e.g., PUCCH) on either a PCell or one additional SCell, which may each represent an uplink component carrier. Such PUCCH transmission may be supported for TDD (e.g., using the TDD pattern 415), and may be used when PCells and SCells have unaligned TDD patterns. For example, the UE 115-*b* may be configured with a PUCCH group 505, including a PCell 510, a Special SCell 515, and an SCell 520. The UE 115-*b* may receive various downlink signaling 525 and transmit various uplink signaling 530 according to a pattern as illustrated in FIG. 5. However, the UE 115-*b* may not be able to transmit feedback on the PCell during downlink signaling 525 of the PCell (e.g., uplink signaling 530 may be unavailable at one or more uplink transmission occasions).

However, a same TDD pattern may be shifted in the Special SCell 515 and the SCell 520. Thus, the UE 115-*b* may transmit uplink communications in PUCCH (including the feedback codebook payloads 450-*a* and 450-*b*) for a PUCCH group using uplink signaling on the special SCell 515 when uplink signaling is unavailable on the PCell 510. In some examples, cells may be switched semi-statically by an RRC configured cell switch time pattern for PUCCH to switch from the PCell 510 to the Special SCell 515. Additionally, or alternatively, the UE 115-*b* may receive a dynamic switch indication, where a field (e.g., 1 bit) in DCI (e.g., of the one or more first messages 440 or the one or more second messages 445) may indicate a target PUCCH cell, which is either PCell or the "special" SCell (configured by RRC), to transmit PUCCH.

In some examples, a feedback codebook type 431 may be a function of a component carrier on which feedback is transmitted, such as the PCell 510 or the special SCell 515. For example, a selected feedback codebook type 431 may be configured separately for PCell versus special SCell as part of corresponding PUCCH configuration. In some cases, the UE 115-*b* may transmit the first feedback codebook payload 450-*a* using the first feedback codebook type 431-*a* when transmitting over the PCell 510, or may transmit the first feedback codebook payload 450-*a* using the second feedback codebook type 431-*b* when transmitting over the Special SCell 515 according to the PUCCH configuration. In some examples, the size of a codebook for a given downlink component carrier may depend on the PUCCH component carrier. For example, a $K_1$ window may be configured per PUCCH component carrier.

Figure 6:
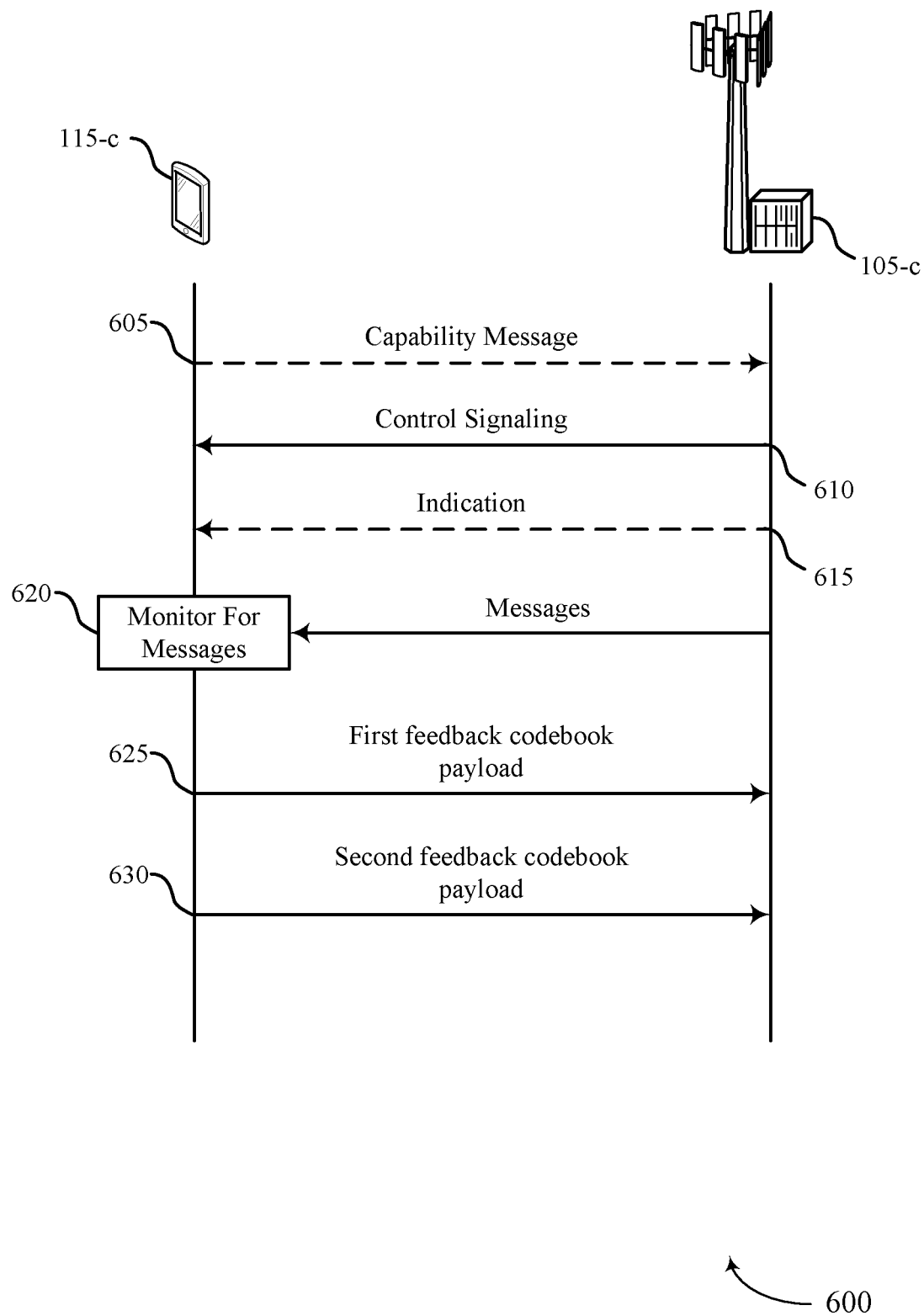
FIG. 6 shows an example of a process flow that supports slot-based feedback codebook type switching in accordance with one or more aspects of the present disclosure.

FIG. 6 shows an example of a process flow 600 that supports slot-based feedback codebook type switching in accordance with one or more aspects of the present disclosure. In some examples, the process flow 600 may implement aspects of the wireless communications systems 100, 200, and 400, and the slot diagrams 300 and 500. For example, the process flow 600 may illustrate an example of a network entity 105 and a UE 115 exchanging one or more first messages 440, one or more second messages 445, a first feedback codebook payload 450-*a*, and a second feedback codebook payload 450-*b* according to different types of feedback codebook types 431 during one or more different feedback time slots. The network entity 105-*c* and the UE 115-*c* may be examples of a network entity 105-*a* or 105-*b*, and a UE 115-*a* or 115-*b*, respectively, as described with reference to FIGS. 2-5.

Alternative examples of the following may be implemented, where some processes are performed in a different order than described or are not performed. In some cases, processes may include additional features not mentioned below, or further processes may be added.

At 605, the UE 115-*c* may optionally transmit, and the network entity 105-*c* may optionally receive, a capability message indicating that the UE supports feedback codebook type switching.

At 610, the network entity 105-*c* may transmit, and the UE 115-*c* may receive, control signaling indicating a set of multiple feedback codebook types that the UE 115-*c* is permitted to use for transmitting feedback codebook payloads in a set of multiple feedback time slots. Additionally, or alternatively, the control signaling may indicate that switching between feedback codebook types is enabled for transmitting feedback codebook payloads in different feedback time slots of the set of multiple of feedback time slots.

At 615, the network entity 105-*c* may optionally transmit, and the UE 115-*c* may receive, an indication of the second feedback codebook type based at least in part on a size of the second feedback codebook payload associated with the second feedback codebook type being less than a size of a feedback codebook payload associated with a different codebook type of the set of multiple of feedback codebook types. Additionally, or alternatively, the indication may be based on a difference between the size of the second feedback codebook payload and the size of the feedback codebook payload failing to satisfy a threshold, based on one or more component carriers on which the one or more first messages, the one or more second messages, the first feedback codebook payload, or the second feedback codebook payload are scheduled for transmission, or any combination thereof as described with respect to FIGS. 2-5.

In some examples, the indication may include an indication of a pattern mapping the first feedback codebook type to the first feedback time slot and the second feedback codebook type to the second feedback time slot. In some examples, the indication of the pattern may be transmitted within the control signaling, within second control signaling, or both. Additionally, or alternatively, transmitting the indication comprises may include transmitting an indication (e.g., a dynamic indication) to switch from the first feedback codebook type to the second feedback codebook type. Transmitting the indication may also include transmitting, within the one or more first messages, an indication of the first feedback codebook type, and transmitting, within the one or more second messages, an indication of the second feedback codebook type.

At 620, the UE 115-*c* may monitor for, and the network entity 105-*c* may transmit, one or more first messages within one or more first time slots and one or more second messages within one or more second time slots. For example, the UE 115-*c* may receive one or more DCIs, PDSCHs, or other messages as described with respect to FIGS. 2-5. In some examples, the one or more first time slots and the one or more second time slots may at least partially overlap. For example, the one or more first messages may and the one or more second messages may represent any combination of DCIs, PDSCHS, or other messages received within one or more downlink slots or special slots as described with reference to FIGS. 2-5.

At 625, the UE 115-*c* may transmit, and the network entity 105-*c* may receive, in a first feedback time slot of the set of multiple of feedback time slots, a first feedback codebook payload in accordance with a first feedback codebook type of the set of multiple of feedback codebook types based on the monitoring for and transmission of the one or more first messages within the one or more first time slots. In some examples, transmitting the first feedback codebook payload in accordance with the first feedback codebook type may be based on the transmission of the indication of the first feedback codebook type.

In some examples, transmitting the first feedback codebook payload in accordance with the first feedback codebook type may be based on the first feedback codebook type being associated with a first component carrier on which the one or more first messages are scheduled for transmission. Additionally, or alternatively, transmitting the second feedback codebook payload in accordance with the second feedback codebook type may be based on the second feedback codebook type being associated with a second component carrier on which the one or more second messages are scheduled for transmission. Additionally, or alternatively, transmitting the first feedback codebook payload in accordance with the first feedback codebook type may be based on the first feedback codebook type being associated with a first component carrier on which the first feedback codebook payload is scheduled for transmission. Additionally, or alternatively, transmitting the second feedback codebook payload in accordance with the second feedback codebook type may be based on the second feedback codebook type being associated with a second component carrier on which the second feedback codebook payload is scheduled for transmission. In some examples, the first component carrier and the second component carrier may each correspond to one of a PCell or a special SCell.

At 630 the UE 115-*c* may transmit, and the network entity 105-*c* may receive, in a second feedback time slot of the set of multiple of feedback time slots, a second feedback codebook payload in accordance with a second feedback codebook type of the set of multiple of feedback codebook types based on the monitoring for and the transmission of the one or more second messages within the one or more second time slots. The transmission of the second feedback codebook payload in accordance with the second feedback codebook type may be based on the transmission of the indication of the second feedback codebook type or based on the transmission of the indication to switch. The transmission of the second feedback codebook payload may additionally be based on the control signaling indicating that switching between feedback codebook types is enabled in different feedback time slots.

In some examples, transmitting the second feedback codebook payload may include transmitting the second feedback codebook payload in accordance with the second feedback codebook type based on a size of the second feedback codebook payload associated with the second feedback codebook type being less than a size of a feedback codebook payload associated with a different codebook type of the set of multiple of feedback codebook types. Additionally, or alternatively, transmitting the second feedback codebook payload may include transmitting the second feedback codebook payload in accordance with the second feedback codebook type based on a difference between a size of the second feedback codebook payload associated with the second feedback codebook type and a size of a feedback codebook payload associated with a different codebook type of the set of multiple of feedback codebook types failing to satisfy a threshold.

In some examples, the one or more first messages, the one or more second messages, or both, include one or more DCI messages, one or more PDSCH messages, or any combination thereof. Additionally, or alternatively, the first feedback codebook type, the second feedback codebook type, or both, may be associated with a quantity of PDSCH reception occasions, a quantity of received DCI messages, a quantity of PDCCH monitoring occasions, one or more feedback process numbers, or any combination thereof. In some examples, transmitting the first feedback codebook payload in accordance with the first feedback codebook type and the second feedback codebook payload in accordance with the second feedback codebook type may be based on the transmission of the capability message.

Figure 7:
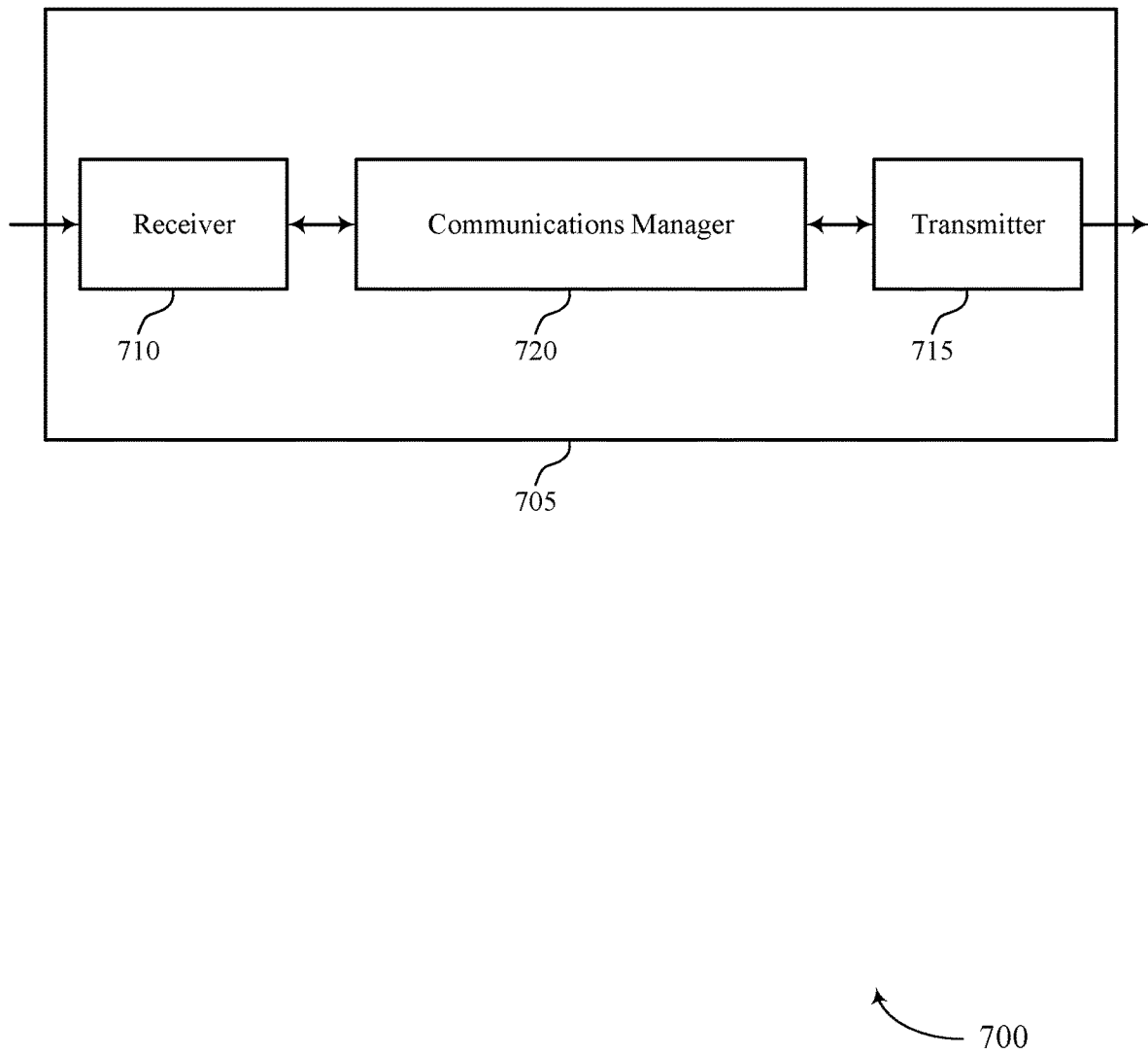
FIGS. 7 and 8 show block diagrams of devices that support slot-based feedback codebook type switching in accordance with one or more aspects of the present disclosure.

FIG. 7 shows a block diagram 700 of a device 705 that supports slot-based feedback codebook type switching in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to slot-based feedback codebook type switching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to slot-based feedback codebook type switching). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of slot-based feedback codebook type switching as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 is capable of, configured to, or operable to support a means for receiving control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The communications manager 720 is capable of, configured to, or operable to support a means for monitoring for one or more first messages within one or more first time slots and one or more second messages within one or more second time slots. The communications manager 720 is capable of, configured to, or operable to support a means for transmitting, in a first feedback time slot of the set of multiple feedback time slots, a first feedback codebook payload in accordance with a first feedback codebook type of the set of multiple feedback codebook types based on monitoring for the one or more first messages within the one or more first time slots. The communications manager 720 is capable of, configured to, or operable to support a means for transmitting, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources (e.g., by enabling switching to smaller codebooks), improved communication reliability (e.g., by enabling switching from less reliable codebooks, such as dynamic codebooks, to codebooks with greater reliability, such as semi-static codebooks), among other advantages.

Figure 8:
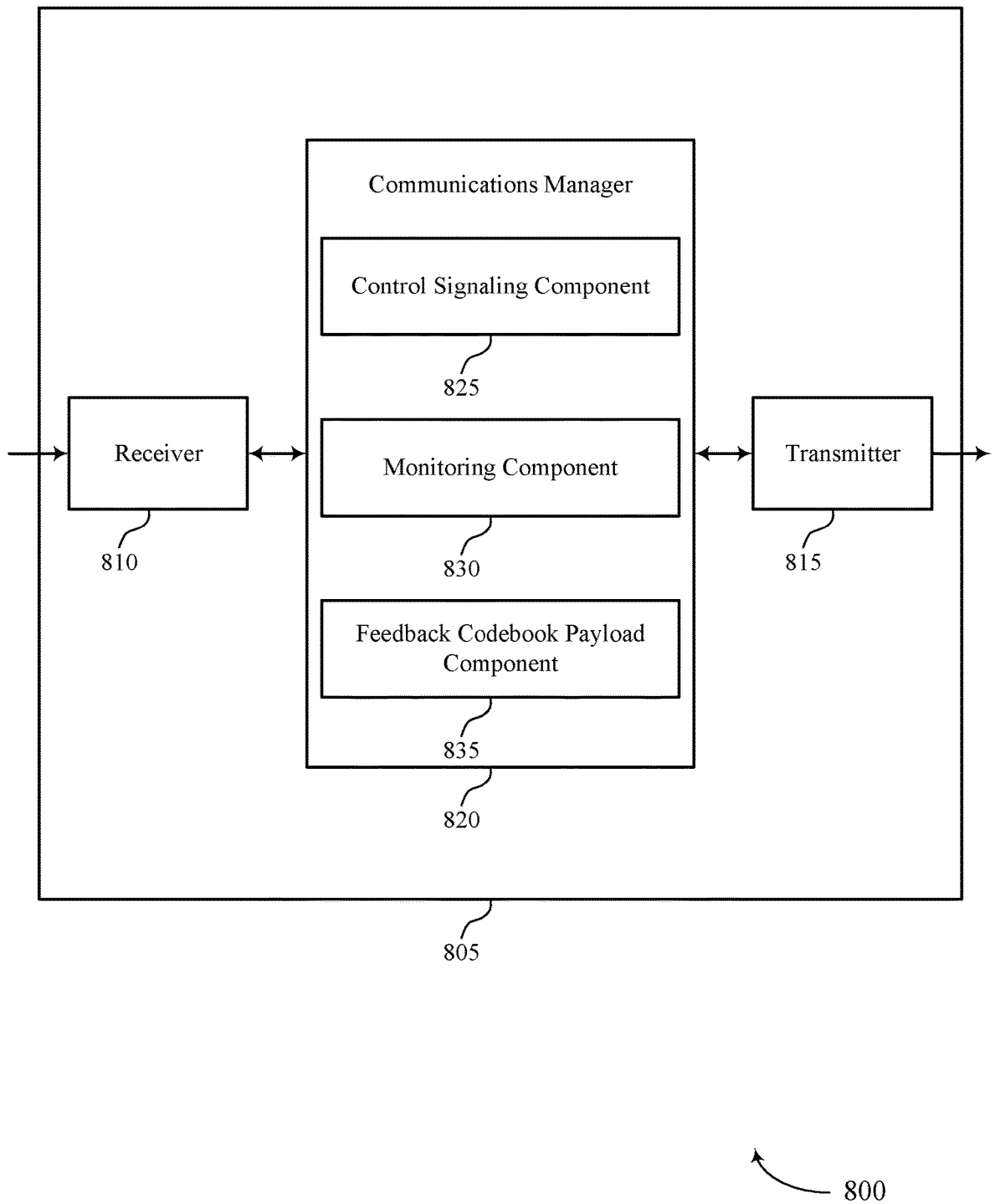

FIG. 8 shows a block diagram 800 of a device 805 that supports slot-based feedback codebook type switching in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to slot-based feedback codebook type switching). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to slot-based feedback codebook type switching). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of slot-based feedback codebook type switching as described herein. For example, the communications manager 820 may include a control signaling component 825, a monitoring component 830, a feedback codebook payload component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The control signaling component 825 is capable of, configured to, or operable to support a means for receiving control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The monitoring component 830 is capable of, configured to, or operable to support a means for monitoring for one or more first messages within one or more first time slots and one or more second messages within one or more second time slots. The feedback codebook payload component 835 is capable of, configured to, or operable to support a means for transmitting, in a first feedback time slot of the set of multiple feedback time slots, a first feedback codebook payload in accordance with a first feedback codebook type of the set of multiple feedback codebook types based on monitoring for the one or more first messages within the one or more first time slots. The feedback codebook payload component 835 is capable of, configured to, or operable to support a means for transmitting, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots.

Figure 9:
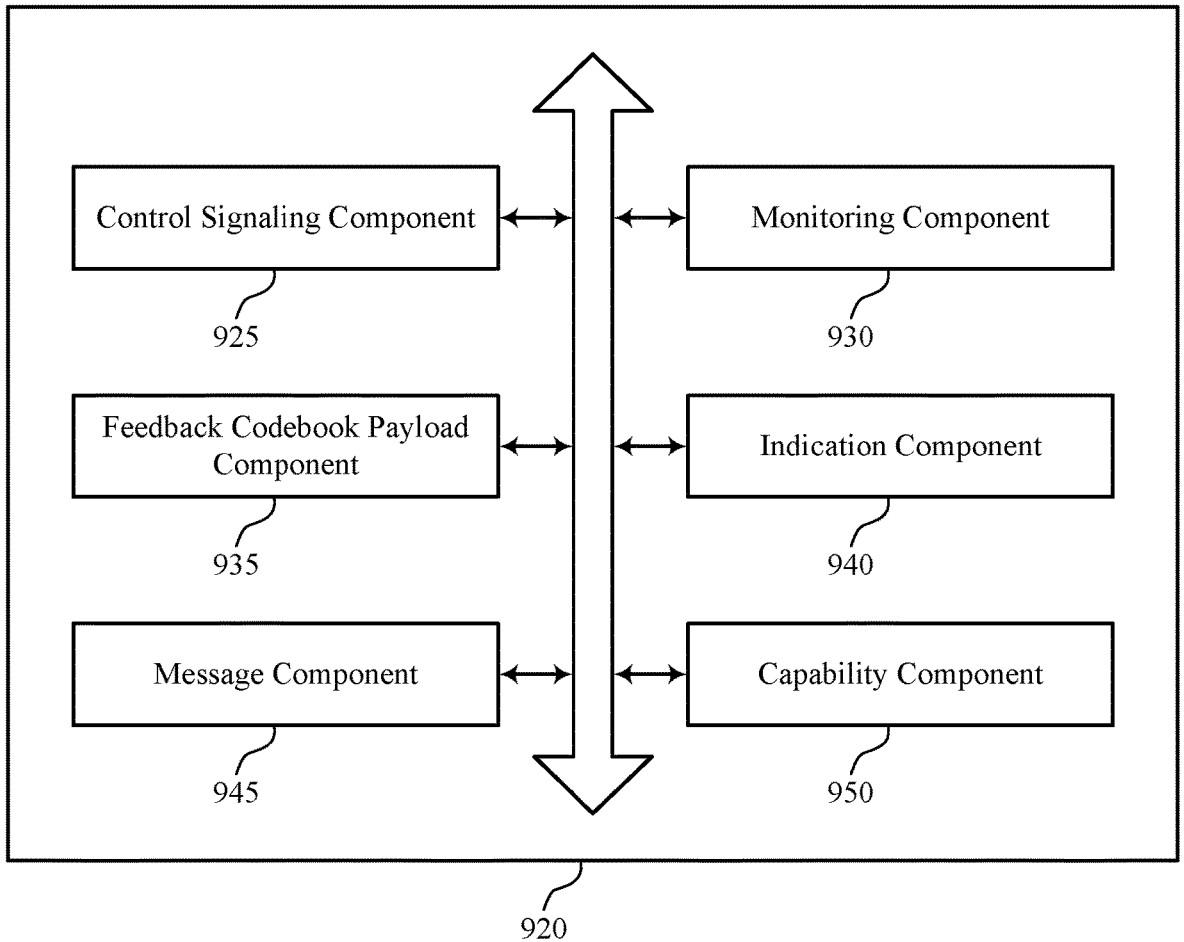
FIG. 9 shows a block diagram of a communications manager that supports slot-based feedback codebook type switching in accordance with one or more aspects of the present disclosure.

FIG. 9 shows a block diagram 900 of a communications manager 920 that supports slot-based feedback codebook type switching in accordance with one or more aspects of the present disclosure. The communications manager 920 may be an example of aspects of a communications manager 720, a communications manager 820, or both, as described herein. The communications manager 920, or various components thereof, may be an example of means for performing various aspects of slot-based feedback codebook type switching as described herein. For example, the communications manager 920 may include a control signaling component 925, a monitoring component 930, a feedback codebook payload component 935, an indication component 940, a message component 945, a capability component 950, or any combination thereof. Each of these components may communicate, directly or indirectly, with one another (e.g., via one or more buses).

The communications manager 920 may support wireless communications at a UE in accordance with examples as disclosed herein. The control signaling component 925 is capable of, configured to, or operable to support a means for receiving control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The monitoring component 930 is capable of, configured to, or operable to support a means for monitoring for one or more first messages within one or more first time slots and one or more second messages within one or more second time slots. The feedback codebook payload component 935 is capable of, configured to, or operable to support a means for transmitting, in a first feedback time slot of the set of multiple feedback time slots, a first feedback codebook payload in accordance with a first feedback codebook type of the set of multiple feedback codebook types based on monitoring for the one or more first messages within the one or more first time slots. In some examples, the feedback codebook payload component 935 is capable of, configured to, or operable to support a means for transmitting, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots.

In some examples, to support transmitting the second feedback codebook payload, the feedback codebook payload component 935 is capable of, configured to, or operable to support a means for transmitting the second feedback codebook payload in accordance with the second feedback codebook type based on a size of the second feedback codebook payload associated with the second feedback codebook type being less than a size of a feedback codebook payload associated with a different codebook type of the set of multiple feedback codebook types.

In some examples, to support transmitting the second feedback codebook payload, the feedback codebook payload component 935 is capable of, configured to, or operable to support a means for transmitting the second feedback codebook payload in accordance with the second feedback codebook type based on a difference between a size of the second feedback codebook payload associated with the second feedback codebook type and a size of a feedback codebook payload associated with a different codebook type of the set of multiple feedback codebook types failing to satisfy a threshold.

In some examples, the indication component 940 is capable of, configured to, or operable to support a means for receiving an indication of a pattern mapping the first feedback codebook type to the first feedback time slot and the second feedback codebook type to the second feedback time slot. In some examples, the indication of the pattern is received within the control signaling, within second control signaling, or both.

In some examples, the indication component 940 is capable of, configured to, or operable to support a means for receiving an indication to switch from the first feedback codebook type to the second feedback codebook type, where transmitting the second feedback codebook payload in accordance with the second feedback codebook type is based on receiving the indication to switch.

In some examples, the message component 945 is capable of, configured to, or operable to support a means for receiving, within the one or more first messages, an indication of the first feedback codebook type, where transmitting the first feedback codebook payload in accordance with the first feedback codebook type is based on receiving the indication of the first feedback codebook type.

In some examples, the message component 945 is capable of, configured to, or operable to support a means for receiving, within the one or more second messages, an indication of the second feedback codebook type, where transmitting the second feedback codebook payload in accordance with the second feedback codebook type is based on receiving the indication of the second feedback codebook type.

In some examples, the capability component 950 is capable of, configured to, or operable to support a means for transmitting a capability message indicating that the UE supports codebook type switching, where transmitting the first feedback codebook payload in accordance with the first feedback codebook type and the second feedback codebook payload in accordance with the second feedback codebook type is based on transmitting the capability message.

In some examples, transmitting the first feedback codebook payload in accordance with the first feedback codebook type is based on the first feedback codebook type being associated with a first component carrier on which the one or more first messages are scheduled for transmission. In some examples, transmitting the second feedback codebook payload in accordance with the second feedback codebook type is based on the second feedback codebook type being associated with a second component carrier on which the one or more second messages are scheduled for transmission.

In some examples, transmitting the first feedback codebook payload in accordance with the first feedback codebook type is based on the first feedback codebook type being associated with a first component carrier on which the first feedback codebook payload is scheduled for transmission. In some examples, transmitting the second feedback codebook payload in accordance with the second feedback codebook type is based on the second feedback codebook type being associated with a second component carrier on which the second feedback codebook payload is scheduled for transmission.

In some examples, the first component carrier and the second component carrier each correspond to one of a PCell or a special Scell. In some examples, the one or more first messages, the one or more second messages, or both, includes one or more DCI messages, one or more PDSCH messages, or any combination thereof. In some examples, the first feedback codebook type, the second feedback codebook type, or both, are associated with a quantity of PDSCH reception occasions, a quantity of received DCI messages, a quantity of PDCCH monitoring occasions, one or more feedback process numbers, or any combination thereof.

Figure 10:
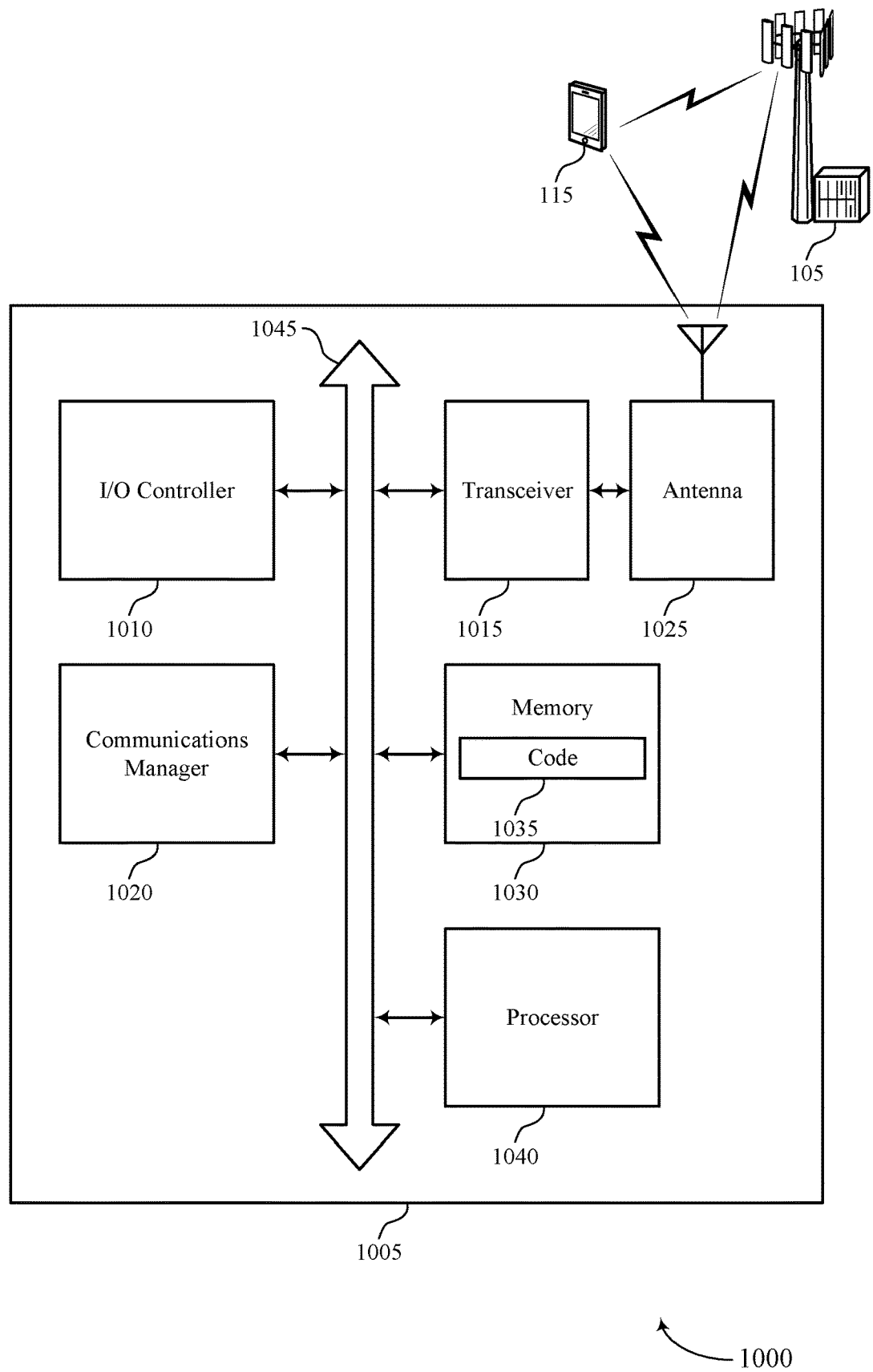
FIG. 10 shows a diagram of a system including a device that supports slot-based feedback codebook type switching in accordance with one or more aspects of the present disclosure.

FIG. 10 shows a diagram of a system 1000 including a device 1005 that supports slot-based feedback codebook type switching in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting slot-based feedback codebook type switching). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 is capable of, configured to, or operable to support a means for receiving control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The communications manager 1020 is capable of, configured to, or operable to support a means for monitoring for one or more first messages within one or more first time slots and one or more second messages within one or more second time slots. The communications manager 1020 is capable of, configured to, or operable to support a means for transmitting, in a first feedback time slot of the set of multiple feedback time slots, a first feedback codebook payload in accordance with a first feedback codebook type of the set of multiple feedback codebook types based on monitoring for the one or more first messages within the one or more first time slots. The communications manager 1020 is capable of, configured to, or operable to support a means for transmitting, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots.

By including or configuring the communications manager 1020 in accordance with examples as described herein, the device 1005 may support techniques for more efficient utilization of communication resources (e.g., by enabling switching to smaller codebooks), improved communication reliability (e.g., by enabling switching from less reliable codebooks, such as dynamic codebooks, to codebooks with greater reliability, such as semi-static codebooks), among other advantages.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of slot-based feedback codebook type switching as described herein, or the processor 1040 and the memory 1030 may be otherwise configured to perform or support such operations.

Figure 11:
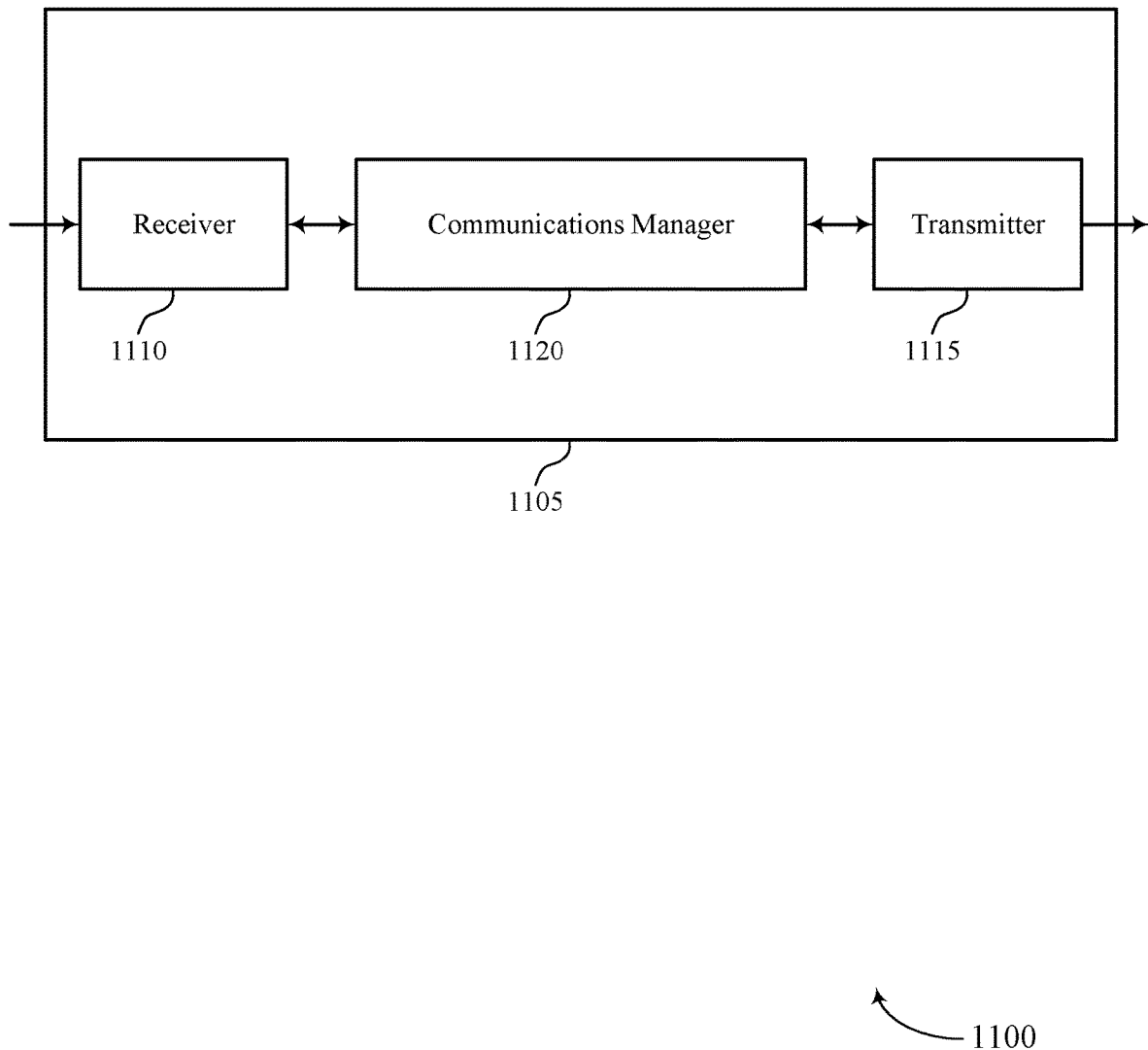
FIGS. 11 and 12 show block diagrams of devices that support slot-based feedback codebook type switching in accordance with one or more aspects of the present disclosure.

FIG. 11 shows a block diagram 1100 of a device 1105 that supports slot-based feedback codebook type switching in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of slot-based feedback codebook type switching as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 is capable of, configured to, or operable to support a means for transmitting control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The communications manager 1120 is capable of, configured to, or operable to support a means for transmitting one or more first messages within one or more first time slots and one or more second messages within one or more second time slots. The communications manager 1120 is capable of, configured to, or operable to support a means for receiving, in a first feedback time slot of the set of multiple feedback time slots, a first feedback codebook payload in accordance with a first feedback codebook type of the set of multiple feedback codebook types based on transmitting the one or more first messages within the one or more first time slots. The communications manager 1120 is capable of, configured to, or operable to support a means for receiving, in a second feedback time slot of the set of multiple feedback time slots, a second feedback codebook payload in accordance with a second feedback codebook type of the set of multiple feedback codebook types based on transmitting the one or more second messages within the one or more second time slots and the control signaling indicating that switching between feedback codebook types is enabled in different feedback time slots.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources (e.g., by enabling switching to smaller codebooks), improved communication reliability (e.g., by enabling switching from less reliable codebooks, such as dynamic codebooks, to codebooks with greater reliability, such as semi-static codebooks), among other advantages.

Figure 12:
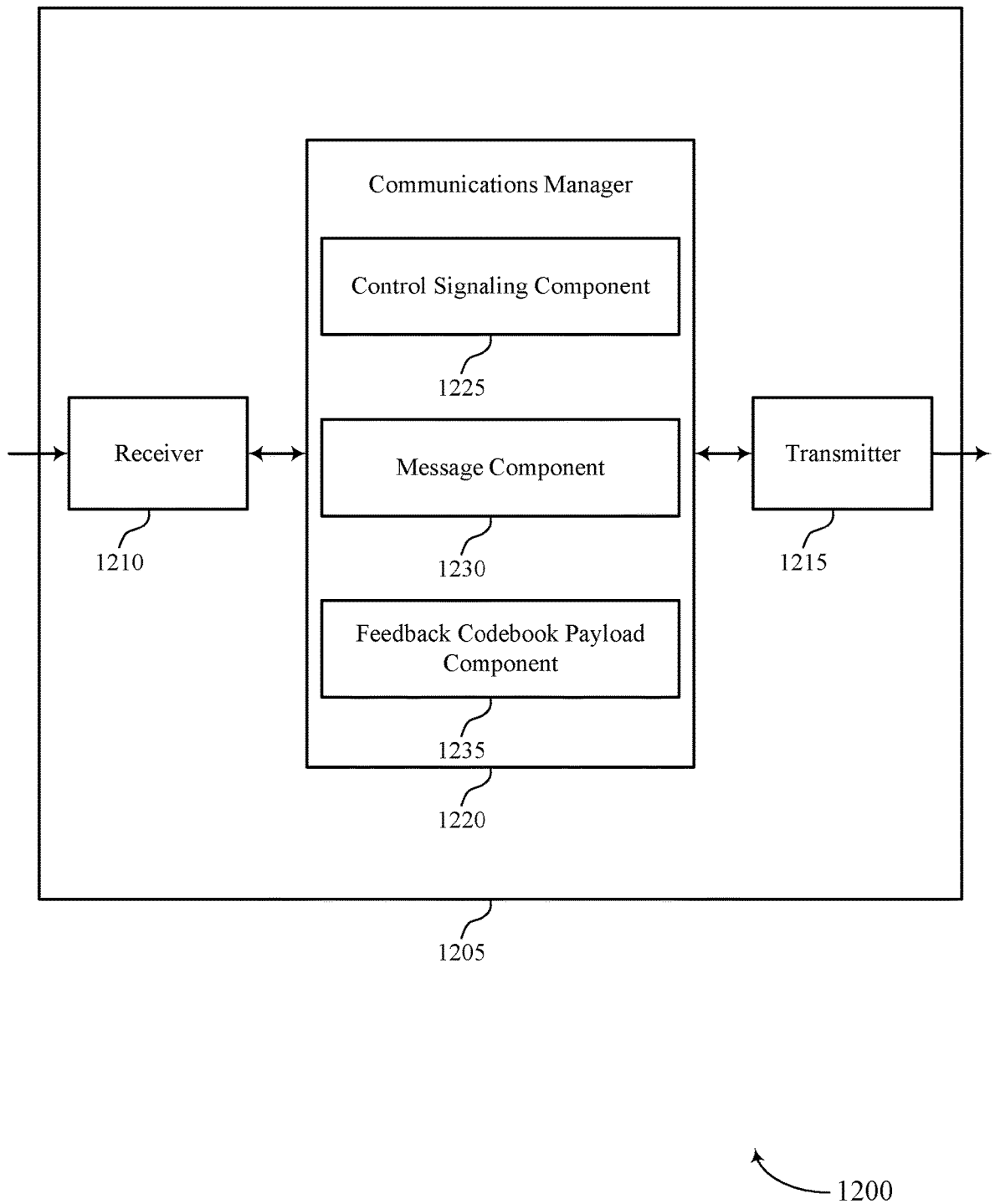

FIG. 12 shows a block diagram 1200 of a device 1205 that supports slot-based feedback codebook type switching in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of slot-based feedback codebook type switching as described herein. For example, the communications manager 1220 may include a control signaling component 1225, a message component 1230, a feedback codebook payload component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The control signaling component 1225 is capable of, configured to, or operable to support a means for transmitting control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The message component 1230 is capable of, configured to, or operable to support a means for transmitting one or more first messages within one or more first time slots and one or more second messages within one or more second time slots. The feedback codebook payload component 1235 is capable of, configured to, or operable to support a means for receiving, in a first feedback time slot of the set of multiple feedback time slots, a first feedback codebook payload in accordance with a first feedback codebook type of the set of multiple feedback codebook types based on transmitting the one or more first messages within the one or more first time slots. The feedback codebook payload component 1235 is capable of, configured to, or operable to support a means for receiving, in a second feedback time slot of the set of multiple feedback time slots, a second feedback codebook payload in accordance with a second feedback codebook type of the set of multiple feedback codebook types based on transmitting the one or more second messages within the one or more second time slots and the control signaling indicating that switching between feedback codebook types is enabled in different feedback time slots.

Figure 13:
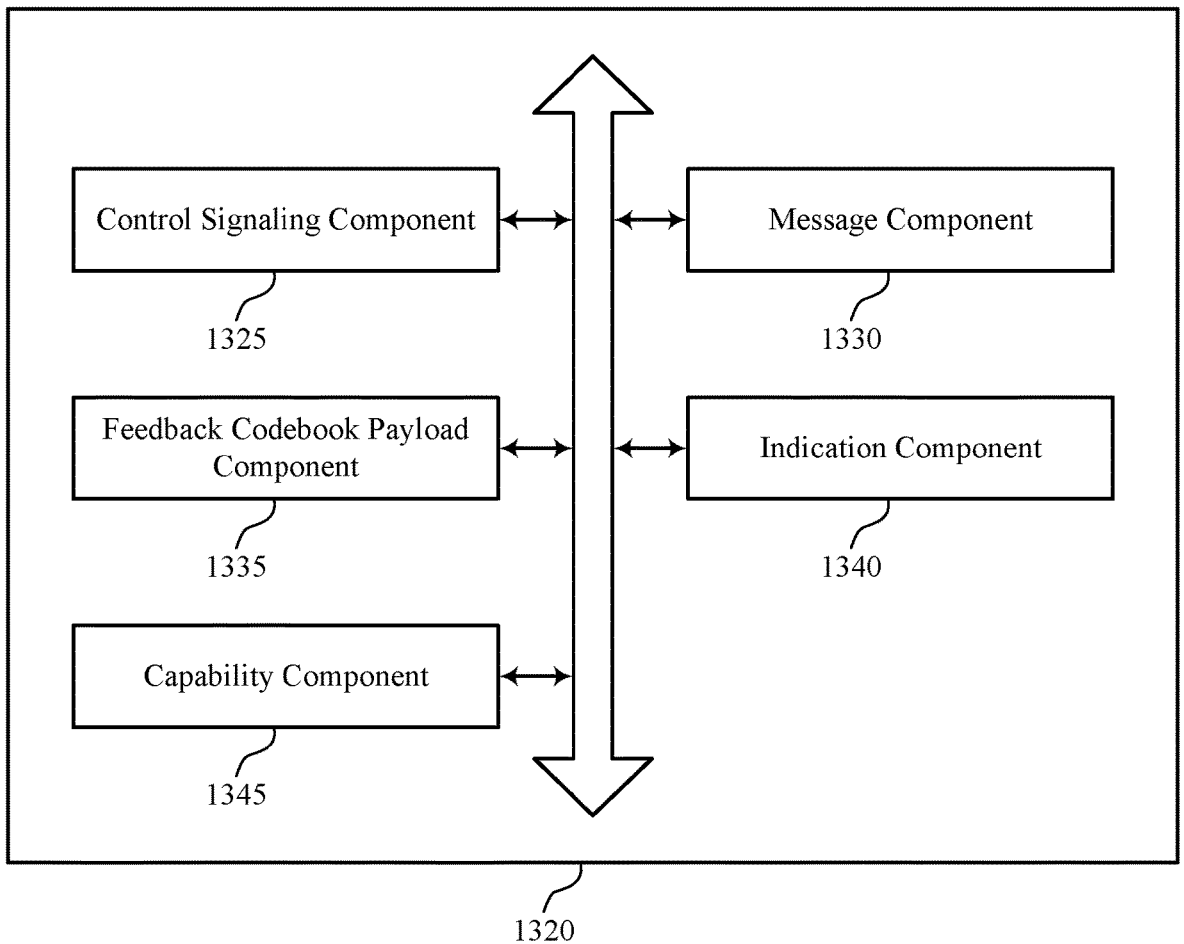
FIG. 13 shows a block diagram of a communications manager that supports slot-based feedback codebook type switching in accordance with one or more aspects of the present disclosure.

FIG. 13 shows a block diagram 1300 of a communications manager 1320 that supports slot-based feedback codebook type switching in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of slot-based feedback codebook type switching as described herein. For example, the communications manager 1320 may include a control signaling component 1325, a message component 1330, a feedback codebook payload component 1335, an indication component 1340, a capability component 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The control signaling component 1325 is capable of, configured to, or operable to support a means for transmitting control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The message component 1330 is capable of, configured to, or operable to support a means for transmitting one or more first messages within one or more first time slots and one or more second messages within one or more second time slots. The feedback codebook payload component 1335 is capable of, configured to, or operable to support a means for receiving, in a first feedback time slot of the set of multiple feedback time slots, a first feedback codebook payload in accordance with a first feedback codebook type of the set of multiple feedback codebook types based on transmitting the one or more first messages within the one or more first time slots. In some examples, the feedback codebook payload component 1335 is capable of, configured to, or operable to support a means for receiving, in a second feedback time slot of the set of multiple feedback time slots, a second feedback codebook payload in accordance with a second feedback codebook type of the set of multiple feedback codebook types based on transmitting the one or more second messages within the one or more second time slots and the control signaling indicating that switching between feedback codebook types is enabled in different feedback time slots.

In some examples, to support receiving the second feedback codebook payload, the feedback codebook payload component 1335 is capable of, configured to, or operable to support a means for receiving the second feedback codebook payload in accordance with the second feedback codebook type based on a size of the second feedback codebook payload associated with the second feedback codebook type being less than a size of a feedback codebook payload associated with a different codebook type of the set of multiple feedback codebook types.

In some examples, to support receiving the second feedback codebook payload, the feedback codebook payload component 1335 is capable of, configured to, or operable to support a means for receiving the second feedback codebook payload in accordance with the second feedback codebook type based on a difference between a size of the second feedback codebook payload associated with the second feedback codebook type and a size of a feedback codebook payload associated with a different codebook type of the set of multiple feedback codebook types failing to satisfy a threshold.

In some examples, the indication component 1340 is capable of, configured to, or operable to support a means for transmitting an indication of the second feedback codebook type based on a size of the second feedback codebook payload associated with the second feedback codebook type being less than a size of a feedback codebook payload associated with a different codebook type of the set of multiple feedback codebook types, a difference between the size of the second feedback codebook payload and the size of the feedback codebook payload failing to satisfy a threshold, based on one or more component carriers on which the one or more first messages, the one or more second messages, the first feedback codebook payload, or the second feedback codebook payload are scheduled for transmission, or any combination thereof.

In some examples, to support transmitting the indication, the indication component 1340 is capable of, configured to, or operable to support a means for transmitting an indication of a pattern mapping the first feedback codebook type to the first feedback time slot and the second feedback codebook type to the second feedback time slot. In some examples, the indication of the pattern is transmitted within the control signaling, within second control signaling, or both.

In some examples, to support transmitting the indication, the indication component 1340 is capable of, configured to, or operable to support a means for transmitting an indication to switch from the first feedback codebook type to the second feedback codebook type, where receiving the second feedback codebook payload in accordance with the second feedback codebook type is based on transmitting the indication to switch.

In some examples, to support transmitting the indication, the message component 1330 is capable of, configured to, or operable to support a means for transmitting, within the one or more first messages, an indication of the first feedback codebook type, where receiving the first feedback codebook payload in accordance with the first feedback codebook type is based on transmitting the indication of the first feedback codebook type. In some examples, to support transmitting the indication, the message component 1330 is capable of, configured to, or operable to support a means for transmitting, within the one or more second messages, an indication of the second feedback codebook type, where receiving the second feedback codebook payload in accordance with the second feedback codebook type is based on transmitting the indication of the second feedback codebook type.

In some examples, the capability component 1345 is capable of, configured to, or operable to support a means for receiving a capability message indicating that the UE supports codebook type switching, where receiving the first feedback codebook payload in accordance with the first feedback codebook type and the second feedback codebook payload in accordance with the second feedback codebook type is based on receiving the capability message.

In some examples, receiving the first feedback codebook payload in accordance with the first feedback codebook type is based on the first feedback codebook type being associated with a first component carrier on which the one or more first messages are scheduled for transmission. In some examples, receiving the second feedback codebook payload in accordance with the second feedback codebook type is based on the second feedback codebook type being associated with a second component carrier on which the one or more second messages are scheduled for transmission.

In some examples, receiving the first feedback codebook payload in accordance with the first feedback codebook type is based on the first feedback codebook type being associated with a first component carrier on which the first feedback codebook payload is scheduled for transmission. In some examples, transmitting the second feedback codebook payload in accordance with the second feedback codebook type is based on the second feedback codebook type being associated with a second component carrier on which the second feedback codebook payload is scheduled for transmission.

In some examples, the first component carrier and the second component carrier each correspond to one of a PCell or a special SCell. In some examples, the one or more first messages, the one or more second messages, or both, includes one or more DCI messages, one or more PDSCH messages, or any combination thereof. In some examples, the first feedback codebook type, the second feedback codebook type, or both, are associated with a quantity of PDSCH reception occasions, a quantity of received DCI messages, a quantity of PDCCH monitoring occasions, one or more feedback process numbers, or any combination thereof.

Figure 14:
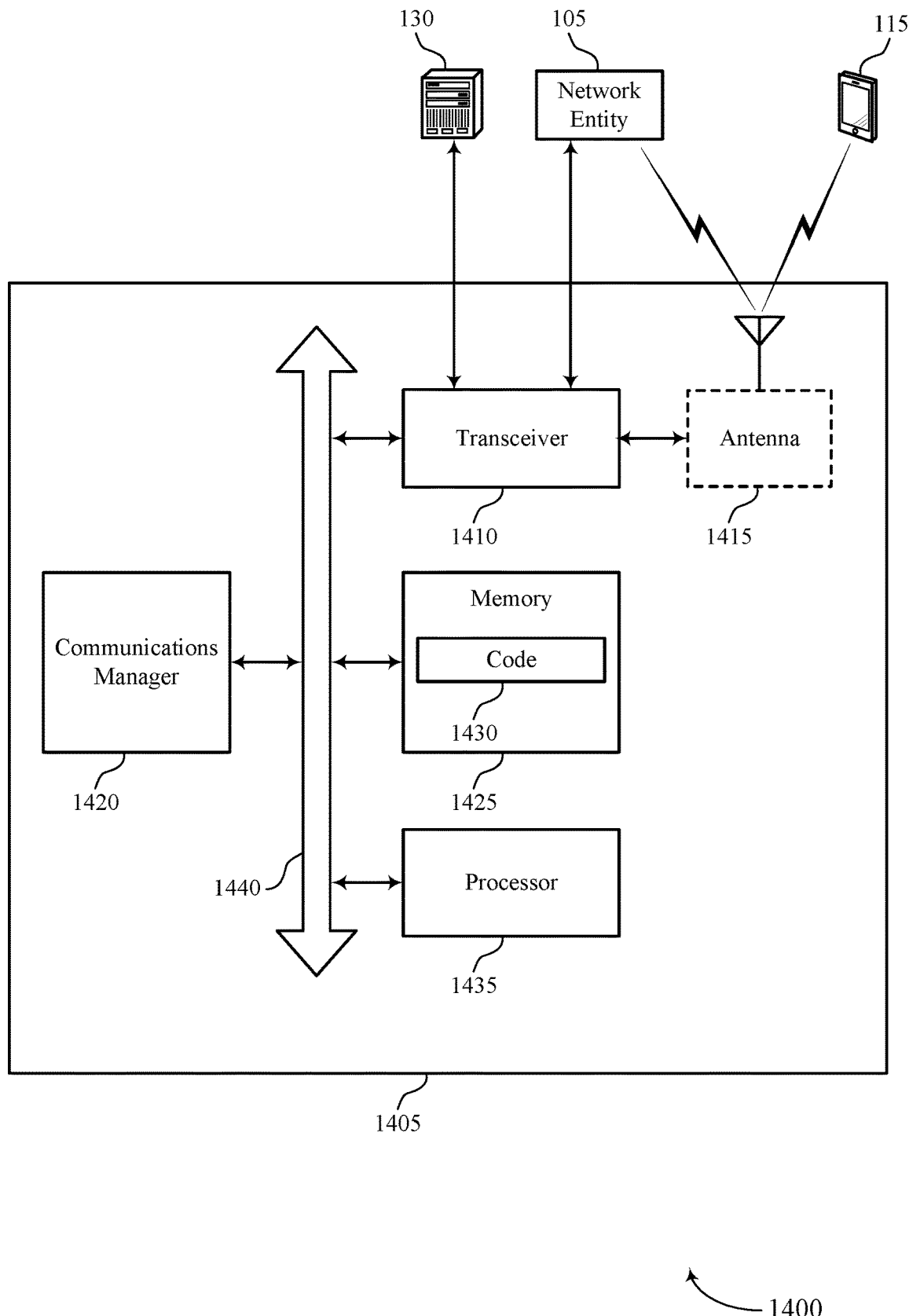
FIG. 14 shows a diagram of a system including a device that supports slot-based feedback codebook type switching in accordance with one or more aspects of the present disclosure.

FIG. 14 shows a diagram of a system 1400 including a device 1405 that supports slot-based feedback codebook type switching in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting slot-based feedback codebook type switching). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 is capable of, configured to, or operable to support a means for transmitting control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The communications manager 1420 is capable of, configured to, or operable to support a means for transmitting one or more first messages within one or more first time slots and one or more second messages within one or more second time slots. The communications manager 1420 is capable of, configured to, or operable to support a means for receiving, in a first feedback time slot of the set of multiple feedback time slots, a first feedback codebook payload in accordance with a first feedback codebook type of the set of multiple feedback codebook types based on transmitting the one or more first messages within the one or more first time slots. The communications manager 1420 is capable of, configured to, or operable to support a means for receiving, in a second feedback time slot of the set of multiple feedback time slots, a second feedback codebook payload in accordance with a second feedback codebook type of the set of multiple feedback codebook types based on transmitting the one or more second messages within the one or more second time slots and the control signaling indicating that switching between feedback codebook types is enabled in different feedback time slots.

By including or configuring the communications manager 1420 in accordance with examples as described herein, the device 1405 may support techniques for more efficient utilization of communication resources (e.g., by enabling switching to smaller codebooks), improved communication reliability (e.g., by enabling switching from less reliable codebooks, such as dynamic codebooks, to codebooks with greater reliability, such as semi-static codebooks), among other advantages.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of slot-based feedback codebook type switching as described herein, or the processor 1435 and the memory 1425 may be otherwise configured to perform or support such operations.

Figure 15:
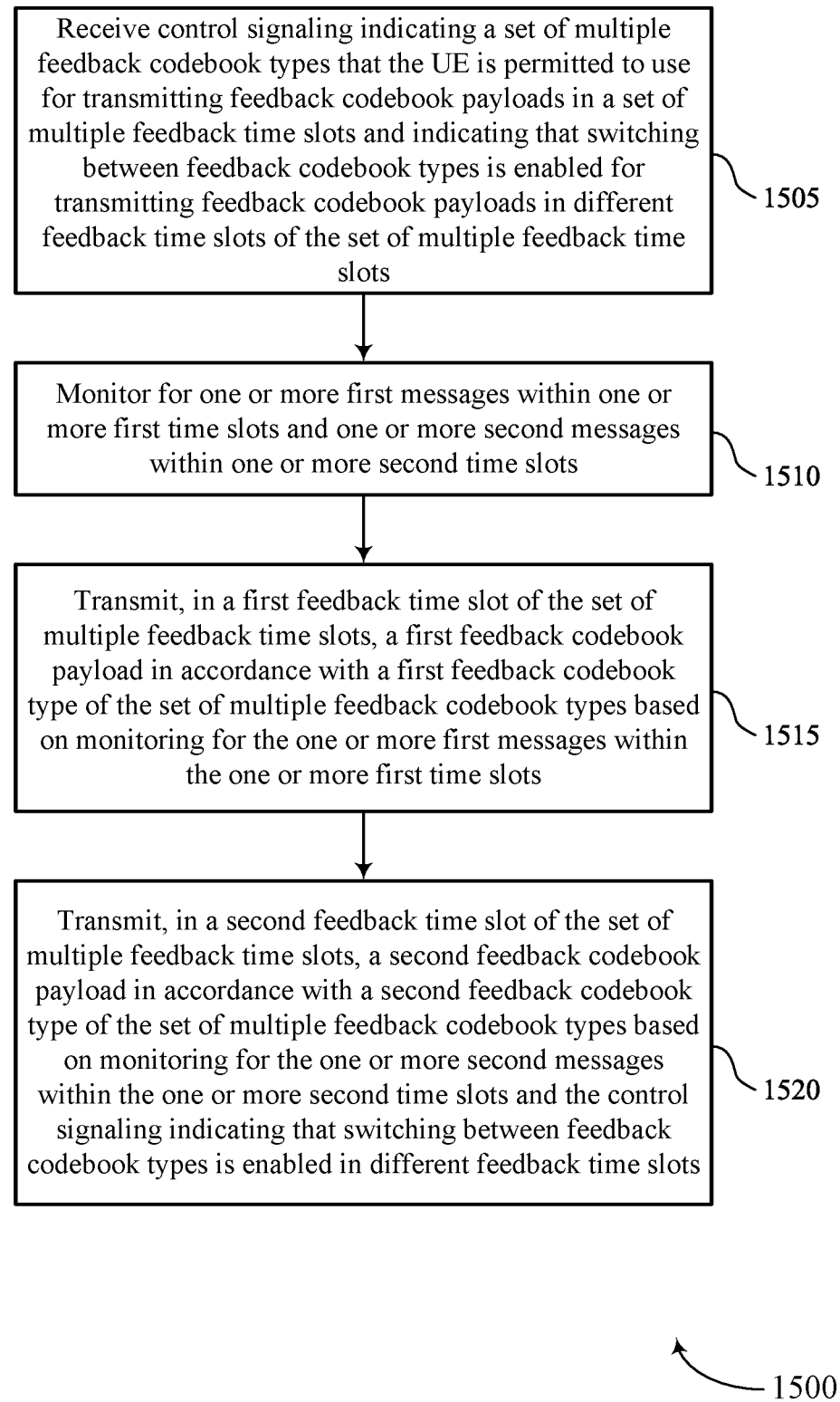
FIGS. 15 through 19 show flowcharts illustrating methods that support slot-based feedback codebook type switching in accordance with one or more aspects of the present disclosure.

FIG. 15 shows a flowchart illustrating a method 1500 that supports slot-based feedback codebook type switching in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The operations of 1505 may be performed in accordance with examples as disclosed herein. In some examples, aspects of the operations of 1505 may be performed by a control signaling component 925 as described with reference to FIG. 9.

At 1510, the method may include monitoring for one or more first messages within one or more first time slots and one or more second messages within one or more second time slots. The operations of 1510 may be performed in accordance with examples as disclosed herein. In some examples, aspects of the operations of 1510 may be performed by a monitoring component 930 as described with reference to FIG. 9.

At 1515, the method may include transmitting, in a first feedback time slot of the set of multiple feedback time slots, a first feedback codebook payload in accordance with a first feedback codebook type of the set of multiple feedback codebook types based on monitoring for the one or more first messages within the one or more first time slots. The operations of 1515 may be performed in accordance with examples as disclosed herein. In some examples, aspects of the operations of 1515 may be performed by a feedback codebook payload component 935 as described with reference to FIG. 9.

At 1520, the method may include transmitting, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots. The operations of 1520 may be performed in accordance with examples as disclosed herein. In some examples, aspects of the operations of 1520 may be performed by a feedback codebook payload component 935 as described with reference to FIG. 9.

Figure 16:
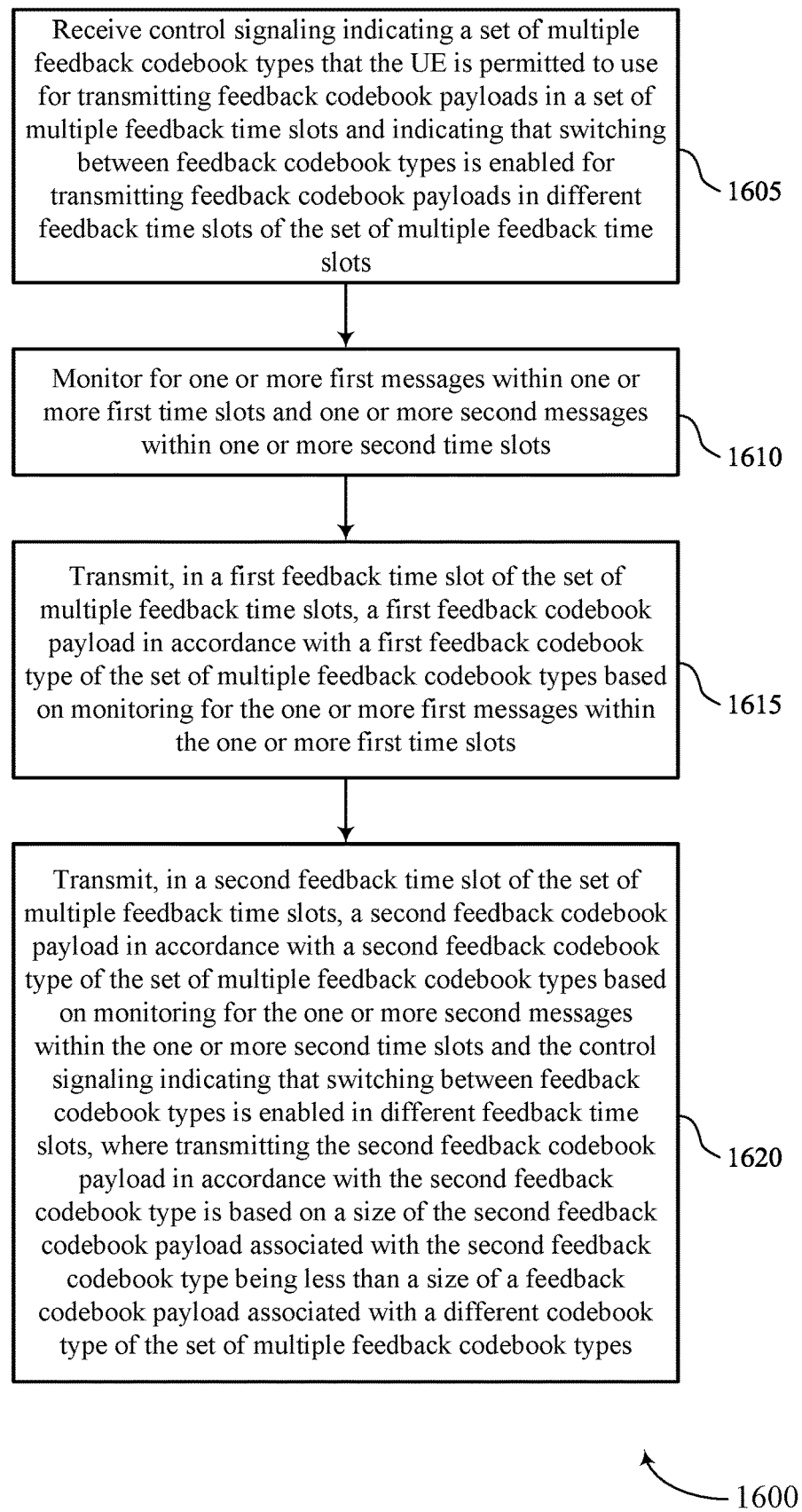

FIG. 16 shows a flowchart illustrating a method 1600 that supports slot-based feedback codebook type switching in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1605, the method may include receiving control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The operations of 1605 may be performed in accordance with examples as disclosed herein. In some examples, aspects of the operations of 1605 may be performed by a control signaling component 925 as described with reference to FIG. 9.

At 1610, the method may include monitoring for one or more first messages within one or more first time slots and one or more second messages within one or more second time slots. The operations of 1610 may be performed in accordance with examples as disclosed herein. In some examples, aspects of the operations of 1610 may be performed by a monitoring component 930 as described with reference to FIG. 9.

At 1615, the method may include transmitting, in a first feedback time slot of the set of multiple feedback time slots, a first feedback codebook payload in accordance with a first feedback codebook type of the set of multiple feedback codebook types based on monitoring for the one or more first messages within the one or more first time slots. The operations of 1615 may be performed in accordance with examples as disclosed herein. In some examples, aspects of the operations of 1615 may be performed by a feedback codebook payload component 935 as described with reference to FIG. 9.

At 1620, the method may include transmitting, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots. Transmitting the second feedback codebook payload in accordance with the second feedback codebook type may be based on a size of the second feedback codebook payload associated with the second feedback codebook type being less than a size of a feedback codebook payload associated with a different codebook type of the set of multiple feedback codebook types.

The operations of 1620 may be performed in accordance with examples as disclosed herein. In some examples, aspects of the operations of 1620 may be performed by a feedback codebook payload component 935 as described with reference to FIG. 9.

Figure 17:
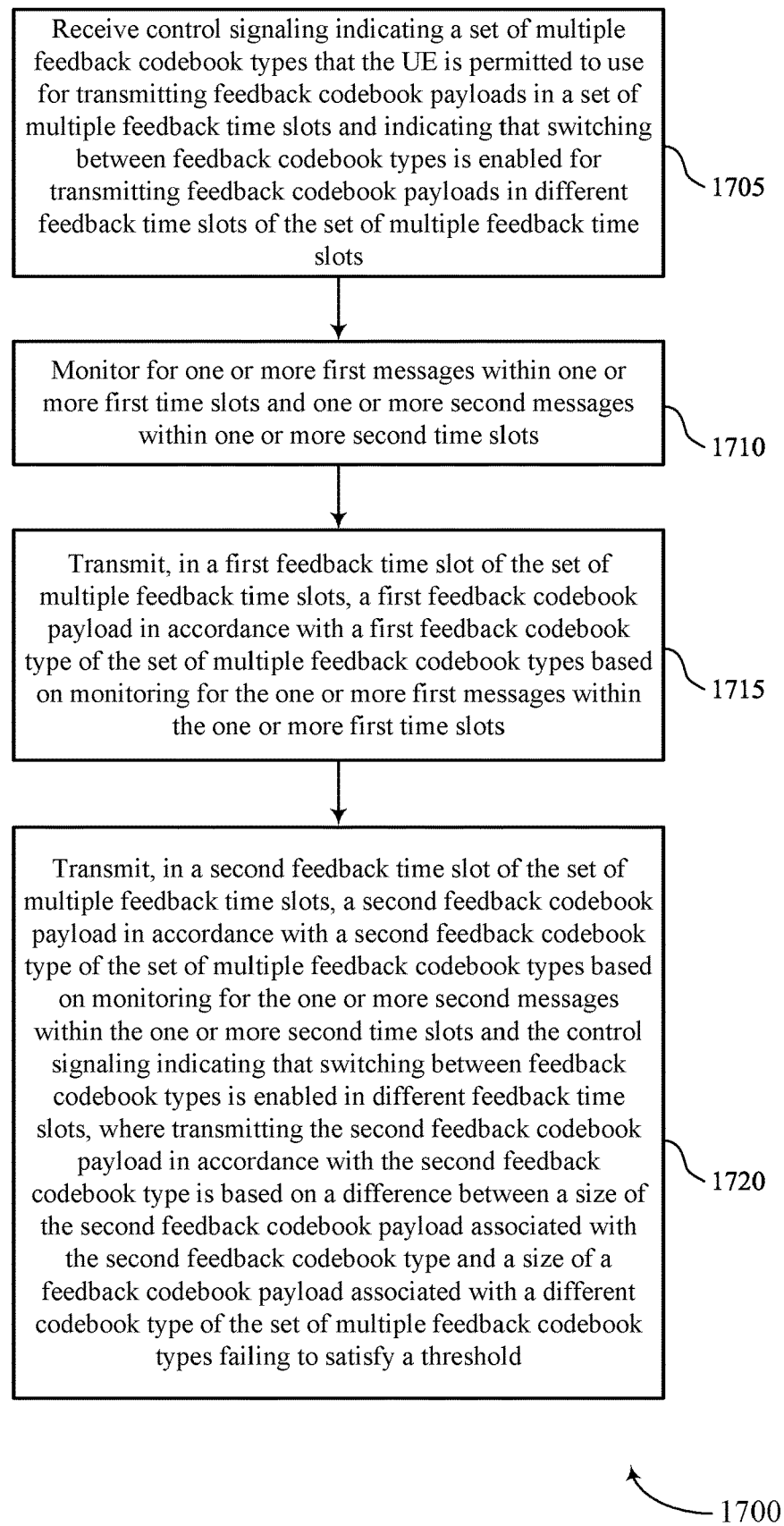

FIG. 17 shows a flowchart illustrating a method 1700 that supports slot-based feedback codebook type switching in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1705, the method may include receiving control signaling indicating a set of multiple feedback codebook types that the UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The operations of 1705 may be performed in accordance with examples as disclosed herein. In some examples, aspects of the operations of 1705 may be performed by a control signaling component 925 as described with reference to FIG. 9.

At 1710, the method may include monitoring for one or more first messages within one or more first time slots and one or more second messages within one or more second time slots. The operations of 1710 may be performed in accordance with examples as disclosed herein. In some examples, aspects of the operations of 1710 may be performed by a monitoring component 930 as described with reference to FIG. 9.

At 1715, the method may include transmitting, in a first feedback time slot of the set of multiple feedback time slots, a first feedback codebook payload in accordance with a first feedback codebook type of the set of multiple feedback codebook types based on monitoring for the one or more first messages within the one or more first time slots. The operations of 1715 may be performed in accordance with examples as disclosed herein. In some examples, aspects of the operations of 1715 may be performed by a feedback codebook payload component 935 as described with reference to FIG. 9.

At 1720, the method may include transmitting, in a second feedback time slot of the set of multiple feedback time slots, a second feedback codebook payload in accordance with a second feedback codebook type of the set of multiple feedback codebook types based on monitoring for the one or more second messages within the one or more second time slots and the control signaling indicating that switching between feedback codebook types is enabled in different feedback time slots. Transmitting the second feedback codebook payload in accordance with the second feedback codebook type may be based on a difference between a size of the second feedback codebook payload associated with the second feedback codebook type and a size of a feedback codebook payload associated with a different codebook type of the set of multiple feedback codebook types failing to satisfy a threshold. The operations of 1720 may be performed in accordance with examples as disclosed herein. In some examples, aspects of the operations of 1720 may be performed by a feedback codebook payload component 935 as described with reference to FIG. 9.

Figure 18:
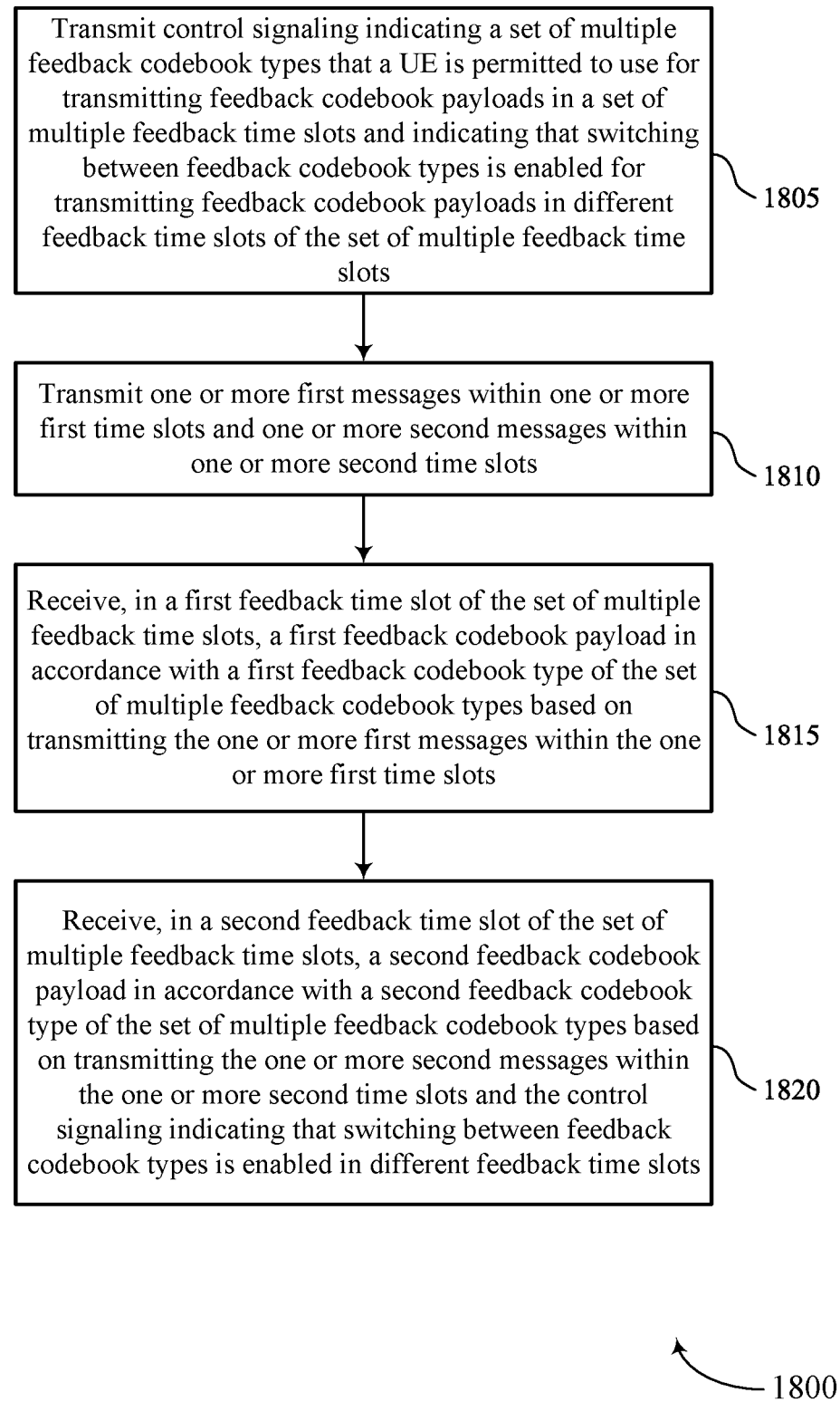

FIG. 18 shows a flowchart illustrating a method 1800 that supports slot-based feedback codebook type switching in accordance with aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the wireless network entity to perform the described functions. Additionally, or alternatively, the wireless network entity may perform aspects of the described functions using special-purpose hardware.

At 1805, the method may include transmitting control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The operations of 1805 may be performed in accordance with examples as disclosed herein. In some examples, aspects of the operations of 1805 may be performed by a control signaling component 1325 as described with reference to FIG. 13.

At 1810, the method may include transmitting one or more first messages within one or more first time slots and one or more second messages within one or more second time slots. The operations of 1810 may be performed in accordance with examples as disclosed herein. In some examples, aspects of the operations of 1810 may be performed by a message component 1330 as described with reference to FIG. 13.

At 1815, the method may include receiving, in a first feedback time slot of the set of multiple feedback time slots, a first feedback codebook payload in accordance with a first feedback codebook type of the set of multiple feedback codebook types based on transmitting the one or more first messages within the one or more first time slots. The operations of 1815 may be performed in accordance with examples as disclosed herein. In some examples, aspects of the operations of 1815 may be performed by a feedback codebook payload component 1335 as described with reference to FIG. 13.

At 1820, the method may include receiving, in a second feedback time slot of the set of multiple feedback time slots, a second feedback codebook payload in accordance with a second feedback codebook type of the set of multiple feedback codebook types based on transmitting the one or more second messages within the one or more second time slots and the control signaling indicating that switching between feedback codebook types is enabled in different feedback time slots. The operations of 1820 may be performed in accordance with examples as disclosed herein. In some examples, aspects of the operations of 1820 may be performed by a feedback codebook payload component 1335 as described with reference to FIG. 13.

Figure 19:
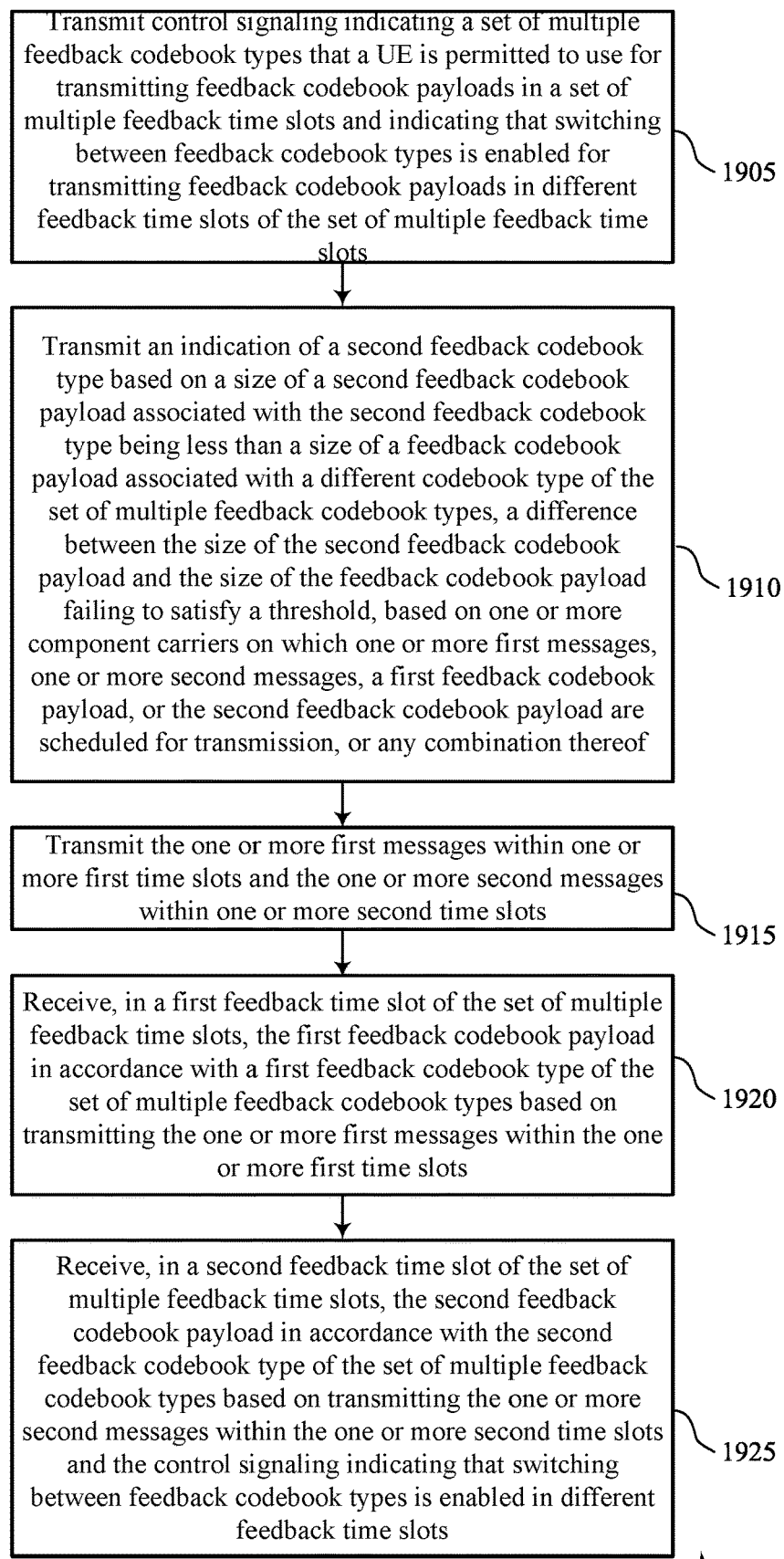

FIG. 19 shows a flowchart illustrating a method 1900 that supports slot-based feedback codebook type switching in accordance with aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the wireless network entity to perform the described functions. Additionally, or alternatively, the wireless network entity may perform aspects of the described functions using special-purpose hardware.

At 1905, the method may include transmitting control signaling indicating a set of multiple feedback codebook types that a UE is permitted to use for transmitting feedback codebook payloads in a set of multiple feedback time slots and indicating that switching between feedback codebook types is enabled for transmitting feedback codebook payloads in different feedback time slots of the set of multiple feedback time slots. The operations of 1905 may be performed in accordance with examples as disclosed herein. In some examples, aspects of the operations of 1905 may be performed by a control signaling component 1325 as described with reference to FIG. 13.

At 1910, the method may include transmitting an indication of a second feedback codebook type based on a size of a second feedback codebook payload associated with the second feedback codebook type being less than a size of a feedback codebook payload associated with a different codebook type of the set of multiple feedback codebook types, a difference between the size of the second feedback codebook payload and the size of the feedback codebook payload failing to satisfy a threshold, based on one or more component carriers on which one or more first messages, one or more second messages, a first feedback codebook payload, or the second feedback codebook payload are scheduled for transmission, or any combination thereof. The operations of 1910 may be performed in accordance with examples as disclosed herein. In some examples, aspects of the operations of 1910 may be performed by an indication component 1340 as described with reference to FIG. 13.

At 1915, the method may include transmitting the one or more first messages within one or more first time slots and the one or more second messages within one or more second time slots. The operations of 1915 may be performed in accordance with examples as disclosed herein. In some examples, aspects of the operations of 1915 may be performed by a message component 1330 as described with reference to FIG. 13.

At 1920, the method may include receiving, in a first feedback time slot of the set of multiple feedback time slots, the first feedback codebook payload in accordance with a first feedback codebook type of the set of multiple feedback codebook types based on transmitting the one or more first messages within the one or more first time slots. The operations of 1920 may be performed in accordance with examples as disclosed herein. In some examples, aspects of the operations of 1920 may be performed by a feedback codebook payload component 1335 as described with reference to FIG. 13.

At 1925, the method may include receiving, in a second feedback time slot of the set of multiple feedback time slots, the second feedback codebook payload in accordance with the second feedback codebook type of the set of multiple feedback codebook types based on transmitting the one or more second messages within the one or more second time slots and the control signaling indicating that switching between feedback codebook types is enabled in different feedback time slots. The operations of 1925 may be performed in accordance with examples as disclosed herein. In some examples, aspects of the operations of 1925 may be performed by a feedback codebook payload component 1335 as described with reference to FIG. 13.

The following provides an overview of aspects of the present disclosure:

Aspect 1: A method for wireless communications at a UE, comprising: receiving control signaling indicating a plurality of feedback codebook types that the UE is permitted to use for transmitting feedback codebook payloads in a plurality of feedback time slots and indicating that switching between feedback codebook types is enabled for transmitting feedback codebook payloads in different feedback time slots of the plurality of feedback time slots; monitoring for one or more first messages within one or more first time slots and one or more second messages within one or more second time slots; transmitting, in a first feedback time slot of the plurality of feedback time slots, a first feedback codebook payload in accordance with a first feedback codebook type of the plurality of feedback codebook types based at least in part on monitoring for the one or more first messages within the one or more first time slots; and transmitting, in a second feedback time slot of the plurality of feedback time slots, a second feedback codebook payload in accordance with a second feedback codebook type of the plurality of feedback codebook types based at least in part on monitoring for the one or more second messages within the one or more second time slots and the control signaling indicating that switching between feedback codebook types is enabled in different feedback time slots.

Aspect 2: The method of aspect 1, wherein transmitting the second feedback codebook payload comprises: transmitting the second feedback codebook payload in accordance with the second feedback codebook type based at least in part on a size of the second feedback codebook payload associated with the second feedback codebook type being less than a size of a feedback codebook payload associated with a different codebook type of the plurality of feedback codebook types.

Aspect 3: The method of any of aspects 1 through 2, wherein transmitting the second feedback codebook payload comprises: transmitting the second feedback codebook payload in accordance with the second feedback codebook type based at least in part on a difference between a size of the second feedback codebook payload associated with the second feedback codebook type and a size of a feedback codebook payload associated with a different codebook type of the plurality of feedback codebook types failing to satisfy a threshold.

Aspect 4: The method of any of aspects 1 through 3, further comprising: receiving an indication of a pattern mapping the first feedback codebook type to the first feedback time slot and the second feedback codebook type to the second feedback time slot.

Aspect 5: The method of aspect 4, wherein the indication of the pattern is received within the control signaling, within second control signaling, or both.

Aspect 6: The method of any of aspects 1 through 5, further comprising: receiving an indication to switch from the first feedback codebook type to the second feedback codebook type, wherein transmitting the second feedback codebook payload in accordance with the second feedback codebook type is based at least in part on receiving the indication to switch.

Aspect 7: The method of any of aspects 1 through 6, further comprising: receiving, within the one or more first messages, an indication of the first feedback codebook type, wherein transmitting the first feedback codebook payload in accordance with the first feedback codebook type is based at least in part on receiving the indication of the first feedback codebook type.

Aspect 8: The method of any of aspects 1 through 7, further comprising: receiving, within the one or more second messages, an indication of the second feedback codebook type, wherein transmitting the second feedback codebook payload in accordance with the second feedback codebook type is based at least in part on receiving the indication of the second feedback codebook type.

Aspect 9: The method of any of aspects 1 through 8, further comprising: transmitting a capability message indicating that the UE supports codebook type switching, wherein transmitting the first feedback codebook payload in accordance with the first feedback codebook type and the second feedback codebook payload in accordance with the second feedback codebook type is based at least in part on transmitting the capability message.

Aspect 10: The method of any of aspects 1 through 9, wherein transmitting the first feedback codebook payload in accordance with the first feedback codebook type is based at least in part on the first feedback codebook type being associated with a first component carrier on which the one or more first messages are scheduled for transmission, and transmitting the second feedback codebook payload in accordance with the second feedback codebook type is based at least in part on the second feedback codebook type being associated with a second component carrier on which the one or more second messages are scheduled for transmission.

Aspect 11: The method of any of aspects 1 through 10, wherein transmitting the first feedback codebook payload in accordance with the first feedback codebook type is based at least in part on the first feedback codebook type being associated with a first component carrier on which the first feedback codebook payload is scheduled for transmission, and transmitting the second feedback codebook payload in accordance with the second feedback codebook type is based at least in part on the second feedback codebook type being associated with a second component carrier on which the second feedback codebook payload is scheduled for transmission.

Aspect 12: The method of aspect 11, wherein the first component carrier and the second component carrier each correspond to one of a primary cell or a special secondary cell.

Aspect 13: The method of any of aspects 1 through 12, wherein the one or more first messages, the one or more second messages, or both, comprises one or more downlink control information messages, one or more physical downlink shared channel messages, or any combination thereof.

Aspect 14: The method of any of aspects 1 through 13, wherein the first feedback codebook type, the second feedback codebook type, or both, are associated with a quantity of physical downlink shared channel reception occasions, a quantity of received downlink control information messages, a quantity of physical downlink control channel monitoring occasions, one or more feedback process numbers, or any combination thereof.

Aspect 15: A method for wireless communications at a network entity, comprising: transmitting control signaling indicating a plurality of feedback codebook types that a UE is permitted to use for transmitting feedback codebook payloads in a plurality of feedback time slots and indicating that switching between feedback codebook types is enabled for transmitting feedback codebook payloads in different feedback time slots of the plurality of feedback time slots; transmitting one or more first messages within one or more first time slots and one or more second messages within one or more second time slots; receiving, in a first feedback time slot of the plurality of feedback time slots, a first feedback codebook payload in accordance with a first feedback codebook type of the plurality of feedback codebook types based at least in part on transmitting the one or more first messages within the one or more first time slots; and receiving, in a second feedback time slot of the plurality of feedback time slots, a second feedback codebook payload in accordance with a second feedback codebook type of the plurality of feedback codebook types based at least in part on transmitting the one or more second messages within the one or more second time slots and the control signaling indicating that switching between feedback codebook types is enabled in different feedback time slots.

Aspect 16: The method of aspect 15, wherein receiving the second feedback codebook payload comprises: receiving the second feedback codebook payload in accordance with the second feedback codebook type based at least in part on a size of the second feedback codebook payload associated with the second feedback codebook type being less than a size of a feedback codebook payload associated with a different codebook type of the plurality of feedback codebook types.

Aspect 17: The method of any of aspects 15 through 16, wherein receiving the second feedback codebook payload comprises: receiving the second feedback codebook payload in accordance with the second feedback codebook type based at least in part on a difference between a size of the second feedback codebook payload associated with the second feedback codebook type and a size of a feedback codebook payload associated with a different codebook type of the plurality of feedback codebook types failing to satisfy a threshold.

Aspect 18: The method of any of aspects 15 through 17, further comprising: transmitting an indication of the second feedback codebook type based at least in part on a size of the second feedback codebook payload associated with the second feedback codebook type being less than a size of a feedback codebook payload associated with a different codebook type of the plurality of feedback codebook types, a difference between the size of the second feedback codebook payload and the size of the feedback codebook payload failing to satisfy a threshold, based at least in part on one or more component carriers on which the one or more first messages, the one or more second messages, the first feedback codebook payload, or the second feedback codebook payload are scheduled for transmission, or any combination thereof.

Aspect 19: The method of aspect 18, wherein transmitting the indication comprises: transmitting an indication of a pattern mapping the first feedback codebook type to the first feedback time slot and the second feedback codebook type to the second feedback time slot.

Aspect 20: The method of aspect 19, wherein the indication of the pattern is transmitted within the control signaling, within second control signaling, or both.

Aspect 21: The method of any of aspects 18 through 20, wherein transmitting the indication comprises: transmitting an indication to switch from the first feedback codebook type to the second feedback codebook type, wherein receiving the second feedback codebook payload in accordance with the second feedback codebook type is based at least in part on transmitting the indication to switch.

Aspect 22: The method of any of aspects 18 through 21, wherein transmitting the indication comprises: transmitting, within the one or more first messages, an indication of the first feedback codebook type, wherein receiving the first feedback codebook payload in accordance with the first feedback codebook type is based at least in part on transmitting the indication of the first feedback codebook type; and transmitting, within the one or more second messages, an indication of the second feedback codebook type, wherein receiving the second feedback codebook payload in accordance with the second feedback codebook type is based at least in part on transmitting the indication of the second feedback codebook type.

Aspect 23: The method of any of aspects 15 through 22, further comprising: receiving a capability message indicating that the UE supports codebook type switching, wherein receiving the first feedback codebook payload in accordance with the first feedback codebook type and the second feedback codebook payload in accordance with the second feedback codebook type is based at least in part on receiving the capability message.

Aspect 24: The method of any of aspects 15 through 23, wherein receiving the first feedback codebook payload in accordance with the first feedback codebook type is based at least in part on the first feedback codebook type being associated with a first component carrier on which the one or more first messages are scheduled for transmission, and receiving the second feedback codebook payload in accordance with the second feedback codebook type is based at least in part on the second feedback codebook type being associated with a second component carrier on which the one or more second messages are scheduled for transmission.

Aspect 25: The method of any of aspects 15 through 24, wherein receiving the first feedback codebook payload in accordance with the first feedback codebook type is based at least in part on the first feedback codebook type being associated with a first component carrier on which the first feedback codebook payload is scheduled for transmission, and transmitting the second feedback codebook payload in accordance with the second feedback codebook type is based at least in part on the second feedback codebook type being associated with a second component carrier on which the second feedback codebook payload is scheduled for transmission.

Aspect 26: The method of aspect 25, wherein the first component carrier and the second component carrier each correspond to one of a primary cell or a special secondary cell.

Aspect 27: The method of any of aspects 15 through 26, wherein the one or more first messages, the one or more second messages, or both, comprises one or more downlink control information messages, one or more physical downlink shared channel messages, or any combination thereof.

Aspect 28: The method of any of aspects 15 through 27, wherein the first feedback codebook type, the second feedback codebook type, or both, are associated with a quantity of physical downlink shared channel reception occasions, a quantity of received downlink control information messages, a quantity of physical downlink control channel monitoring occasions, one or more feedback process numbers, or any combination thereof.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a network entity, comprising a processor; memory coupled with the processor; and instructions stored in the memory and executable by the processor to cause the apparatus to perform a method of any of aspects 15 through 28.

Aspect 33: An apparatus for wireless communications at a network entity, comprising at least one means for performing a method of any of aspects 15 through 28.

Aspect 34: A non-transitory computer-readable medium storing code for wireless communications at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
      receive control signaling indicating a plurality of feedback codebook types that the UE is permitted to use for transmitting feedback codebook payloads in a plurality of feedback time slots and indicating that the UE is to select a feedback codebook type for each feedback time slot of the plurality of feedback time slots;
      monitor for one or more first messages within one or more first time slots and one or more second messages within one or more second time slots;
      transmit, in a first feedback time slot of the plurality of feedback time slots, a first feedback codebook payload in accordance with a first feedback codebook type of the plurality of feedback codebook types based at least in part on monitoring for the one or more first messages within the one or more first time slots; and
      transmit, in a second feedback time slot of the plurality of feedback time slots, a second feedback codebook payload in accordance with a second feedback codebook type of the plurality of feedback codebook types based at least in part on monitoring for the one or more second messages within the one or more second time slots and based at least in part on a difference between a size of the second feedback codebook payload associated with the second feedback codebook type and a size of a feedback codebook payload associated with a different codebook type of the plurality of feedback codebook types failing to satisfy a threshold.

2. The apparatus of claim 1, wherein the instructions to transmit the second feedback codebook payload are executable by the one or more processors to cause the apparatus to:
   transmit the second feedback codebook payload in accordance with the second feedback codebook type based at least in part on the size of the second feedback codebook payload associated with the second feedback codebook type being less than the size of a feedback codebook payload associated with a different codebook type of the plurality of feedback codebook types.

3. The apparatus of claim 1, wherein the instructions are further executable by the one or more processors to cause the apparatus to:
receive an indication of a pattern mapping the first feedback codebook type to the first feedback time slot and the second feedback codebook type to the second feedback time slot.

4. The apparatus of claim 3, wherein the indication of the pattern is received within the control signaling, within second control signaling, or both.

5. The apparatus of claim 1, wherein the instructions are further executable by the one or more processors to cause the apparatus to:
receive an indication to switch from the first feedback codebook type for a second feedback time slot, wherein transmitting the second feedback codebook payload in accordance with the second feedback codebook type is based at least in part on receiving the indication to switch.

6. The apparatus of claim 1, wherein the instructions are further executable by the one or more processors to cause the apparatus to:
receive, within the one or more first messages, an indication of the first feedback codebook type, wherein transmitting the first feedback codebook payload in accordance with the first feedback codebook type is based at least in part on receiving the indication of the first feedback codebook type.

7. The apparatus of claim 1, wherein the instructions are further executable by the one or more processors to cause the apparatus to:
transmit a capability message indicating that the UE supports codebook type switching, wherein transmitting the first feedback codebook payload in accordance with the first feedback codebook type and the second feedback codebook payload in accordance with the second feedback codebook type is based at least in part on transmitting the capability message.

8. The apparatus of claim 1, wherein:
transmitting the first feedback codebook payload in accordance with the first feedback codebook type is based at least in part on the first feedback codebook type being associated with a first component carrier on which the one or more first messages are scheduled for transmission, and
transmitting the second feedback codebook payload in accordance with the second feedback codebook type is based at least in part on the second feedback codebook type being associated with a second component carrier on which the one or more second messages are scheduled for transmission.

9. The apparatus of claim 1, wherein:
transmitting the first feedback codebook payload in accordance with the first feedback codebook type is based at least in part on the first feedback codebook type being associated with a first component carrier on which the first feedback codebook payload is scheduled for transmission, and
transmitting the second feedback codebook payload in accordance with the second feedback codebook type is based at least in part on the second feedback codebook type being associated with a second component carrier on which the second feedback codebook payload is scheduled for transmission.

10. The apparatus of claim 9, wherein the first component carrier and the second component carrier each correspond to one of a primary cell or a special secondary cell.

11. The apparatus of claim 1, wherein the one or more first messages, the one or more second messages, or both, comprises one or more downlink control information messages, one or more physical downlink shared channel messages, or any combination thereof.

12. The apparatus of claim 1, wherein the first feedback codebook type, the second feedback codebook type, or both, are associated with a quantity of physical downlink shared channel reception occasions, a quantity of received downlink control information messages, a quantity of physical downlink control channel monitoring occasions, one or more feedback process numbers, or any combination thereof.

13. An apparatus for wireless communications at a network entity, comprising:
one or more processors;
one or more memories coupled with the one or more processors; and
instructions stored in the one or more memories and executable by the one or more processors to cause the apparatus to:
transmit control signaling indicating a plurality of feedback codebook types that a user equipment (UE) is permitted to use for transmitting feedback codebook payloads in a plurality of feedback time slots and indicating that the UE is to select a feedback codebook type for each feedback time slot of the plurality of feedback time slots;
transmit one or more first messages within one or more first time slots and one or more second messages within one or more second time slots;
receive, in a first feedback time slot of the plurality of feedback time slots, a first feedback codebook payload in accordance with a first feedback codebook type of the plurality of feedback codebook types based at least in part on transmitting the one or more first messages within the one or more first time slots; and
receive, in a second feedback time slot of the plurality of feedback time slots, a second feedback codebook payload in accordance with a second feedback codebook type of the plurality of feedback codebook types based at least in part on transmitting the one or more second messages within the one or more second time slots and based at least in part on a difference between a size of the second feedback codebook payload associated with the second feedback codebook type and a size of a feedback codebook payload associated with a different codebook type of the plurality of feedback codebook types failing to satisfy a threshold.

14. The apparatus of claim 13, wherein the instructions to receive the second feedback codebook payload are executable by the one or more processors to cause the apparatus to:
receive the second feedback codebook payload in accordance with the second feedback codebook type based at least in part on the size of the second feedback codebook payload associated with the second feedback codebook type being less than a size of the feedback codebook payload associated with a different codebook type of the plurality of feedback codebook types.

15. The apparatus of claim 13, wherein the instructions are further executable by the one or more processors to cause the apparatus to:

transmit an indication of the second feedback codebook type based at least in part on a size of the second feedback codebook payload associated with the second feedback codebook type being less than a size of a feedback codebook payload associated with a different codebook type of the plurality of feedback codebook types, a difference between the size of the second feedback codebook payload and the size of the feedback codebook payload failing to satisfy a threshold, based at least in part on one or more component carriers on which the one or more first messages, the one or more second messages, the first feedback codebook payload, or the second feedback codebook payload are scheduled for transmission, or any combination thereof.

16. The apparatus of claim 15, wherein the instructions to transmit the indication are executable by the one or more processors to cause the apparatus to:
transmit an indication of a pattern mapping the first feedback codebook type to the first feedback time slot and the second feedback codebook type to the second feedback time slot.

17. The apparatus of claim 16, wherein the indication of the pattern is transmitted within the control signaling, within second control signaling, or both.

18. The apparatus of claim 15, wherein the instructions to transmit the indication are executable by the one or more processors to cause the apparatus to:
transmit an indication to switch from the first feedback codebook type for a second feedback time slot, wherein receiving the second feedback codebook payload in accordance with the second feedback codebook type is based at least in part on transmitting the indication to switch.

19. The apparatus of claim 15, wherein the instructions to transmit the indication are executable by the one or more processors to cause the apparatus to:
transmit, within the one or more first messages, an indication of the first feedback codebook type, wherein receiving the first feedback codebook payload in accordance with the first feedback codebook type is based at least in part on transmitting the indication of the first feedback codebook type; and
transmit, within the one or more second messages, an indication of the second feedback codebook type, wherein receiving the second feedback codebook payload in accordance with the second feedback codebook type is based at least in part on transmitting the indication of the second feedback codebook type.

20. The apparatus of claim 13, wherein the instructions are further executable by the one or more processors to cause the apparatus to:
receive a capability message indicating that the UE supports codebook type switching, wherein receiving the first feedback codebook payload in accordance with the first feedback codebook type and the second feedback codebook payload in accordance with the second feedback codebook type is based at least in part on receiving the capability message.

21. The apparatus of claim 13, wherein:
receiving the first feedback codebook payload in accordance with the first feedback codebook type is based at least in part on the first feedback codebook type being associated with a first component carrier on which the one or more first messages are scheduled for transmission, and
receiving the second feedback codebook payload in accordance with the second feedback codebook type is based at least in part on the second feedback codebook type being associated with a second component carrier on which the one or more second messages are scheduled for transmission.

22. The apparatus of claim 13, wherein:
receiving the first feedback codebook payload in accordance with the first feedback codebook type is based at least in part on the first feedback codebook type being associated with a first component carrier on which the first feedback codebook payload is scheduled for transmission, and
transmitting the second feedback codebook payload in accordance with the second feedback codebook type is based at least in part on the second feedback codebook type being associated with a second component carrier on which the second feedback codebook payload is scheduled for transmission.

23. The apparatus of claim 22, wherein the first component carrier and the second component carrier each correspond to one of a primary cell or a special secondary cell.

24. The apparatus of claim 13, wherein the one or more first messages, the one or more second messages, or both, comprises one or more downlink control information messages, one or more physical downlink shared channel messages, or any combination thereof.

25. The apparatus of claim 13, wherein the first feedback codebook type, the second feedback codebook type, or both, are associated with a quantity of physical downlink shared channel reception occasions, a quantity of received downlink control information messages, a quantity of physical downlink control channel monitoring occasions, one or more feedback process numbers, or any combination thereof.

26. A method for wireless communications at a user equipment (UE), comprising:
receiving control signaling indicating a plurality of feedback codebook types that the UE is permitted to use for transmitting feedback codebook payloads in a plurality of feedback time slots and indicating that the UE is to select a feedback codebook type for each feedback time slot of the plurality of feedback time slots;
monitoring for one or more first messages within one or more first time slots and one or more second messages within one or more second time slots;
transmitting, in a first feedback time slot of the plurality of feedback time slots, a first feedback codebook payload in accordance with a first feedback codebook type of the plurality of feedback codebook types based at least in part on monitoring for the one or more first messages within the one or more first time slots; and
transmitting, in a second feedback time slot of the plurality of feedback time slots, a second feedback codebook payload in accordance with a second feedback codebook type of the plurality of feedback codebook types based at least in part on monitoring for the one or more second messages within the one or more second time slots and based at least in part on a difference between a size of the second feedback codebook payload associated with the second feedback codebook type and a size of a feedback codebook payload associated with a different codebook type of the plurality of feedback codebook types failing to satisfy a threshold.

27. A method for wireless communications at a network entity, comprising:

transmitting control signaling indicating a plurality of feedback codebook types that a user equipment (UE) is permitted to use for transmitting feedback codebook payloads in a plurality of feedback time slots and indicating that the UE is to select a feedback codebook type for each feedback time slot of the plurality of feedback time slots;

transmitting one or more first messages within one or more first time slots and one or more second messages within one or more second time slots;

receiving, in a first feedback time slot of the plurality of feedback time slots, a first feedback codebook payload in accordance with a first feedback codebook type of the plurality of feedback codebook types based at least in part on transmitting the one or more first messages within the one or more first time slots; and receiving, in a second feedback time slot of the plurality of feedback time slots, a second feedback codebook payload in accordance with a second feedback codebook type of the plurality of feedback codebook types based at least in part on transmitting the one or more second messages within the one or more second time slots and based at least in part on a difference between a size of the second feedback codebook payload associated with the second feedback codebook type and a size of a feedback codebook payload associated with a different codebook type of the plurality of feedback codebook types failing to satisfy a threshold.

* * * * *